n(12) United States Patent  
Kanamaru

(10) Patent No.: US 7,506,323 B2  
(45) Date of Patent: Mar. 17, 2009

(54) PROGRAM EXECUTION PROCESSING TERMINAL DEVICE, PROGRAM EXECUTION PROCESSING METHOD, AND PROGRAM

(75) Inventor: Tomokazu Kanamaru, Kadoma (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 10/496,968

(22) PCT Filed: Jun. 3, 2003

(86) PCT No.: PCT/JP03/06980

§ 371 (c)(1),  
(2), (4) Date: May 27, 2004

(87) PCT Pub. No.: WO03/107186

PCT Pub. Date: Dec. 24, 2003

(65) Prior Publication Data

US 2005/0066283 A1    Mar. 24, 2005

(30) Foreign Application Priority Data

Jun. 18, 2002    (JP)    ............................. 2002-176855

(51) Int. Cl.  
G06F 9/45    (2006.01)

(52) U.S. Cl. ........................ 717/139; 717/138; 717/140; 717/141; 717/142; 717/143; 717/148

(58) Field of Classification Search ......... 717/138–143, 717/148  
See application file for complete search history.

(56) References Cited

U.S. PATENT DOCUMENTS 6,349,344 B1 *    2/2002    Sauntry et al. .............. 717/143

(Continued)

FOREIGN PATENT DOCUMENTS

GB    2 331 814    6/1999

(Continued)

OTHER PUBLICATIONS

Tim Lindholm and Frank Yellin: "The Java (TM) Virtual Machine Specification", Addison-Wesley, 1997, pp. 40-49.

*Primary Examiner*—Wei Y Zhen  
*Assistant Examiner*—Junchun Wu  
(74) *Attorney, Agent, or Firm*—Wenderoth, Lind & Ponack, L.L.P.

(57) ABSTRACT

A loader section (102) for converting a program from a class file to a runtime execution format, a runtime saving section (103) for performing a runtime saving process by which a runtime execution format is converted to a temporary runtime execution format, a temporary runtime execution format storing section (302) for storing a temporary runtime execution format, and a post-loader section (105) for performing a post-loader process by which a temporary runtime execution format is converted to a runtime execution format are included, and determination is made whether or not there is a temporary runtime execution format in the temporary runtime execution format storing section when a start-up of a program is instructed, the loader section is requested to perform conversion to a runtime execution format if there is none, and the post-loader section is requested to perform conversion to a runtime execution format if there is any. As a result, it is possible to reduce a start-up time of a downloaded program in a program distribution service.

27 Claims, 23 Drawing Sheets

U.S. PATENT DOCUMENTS

| | | | |
|---|---|---|---|
| 6,470,494 B1 * | 10/2002 | Chan et al. | 717/139 |
| 6,754,890 B1 * | 6/2004 | Berry et al. | 717/128 |
| 2001/0051970 A1 * | 12/2001 | Webb | 709/1 |
| 2002/0112227 A1 * | 8/2002 | Kramskoy et al. | 717/139 |

FOREIGN PATENT DOCUMENTS

| | | |
|---|---|---|
| JP | 7-191853 | 7/1995 |
| JP | 7-271603 | 10/1995 |
| JP | 9-114673 | 5/1997 |
| JP | 10-506743 | 6/1998 |
| JP | 11-212893 | 8/1999 |
| JP | 11-232115 | 8/1999 |
| JP | 11-327906 | 11/1999 |
| JP | 2000-029706 | 1/2000 |
| JP | 2001-273151 | 10/2001 |
| JP | 2002-508560 | 3/2002 |
| WO | 97/31313 | 8/1997 |
| WO | 99/31576 | 6/1999 |

* cited by examiner

F I G. 2
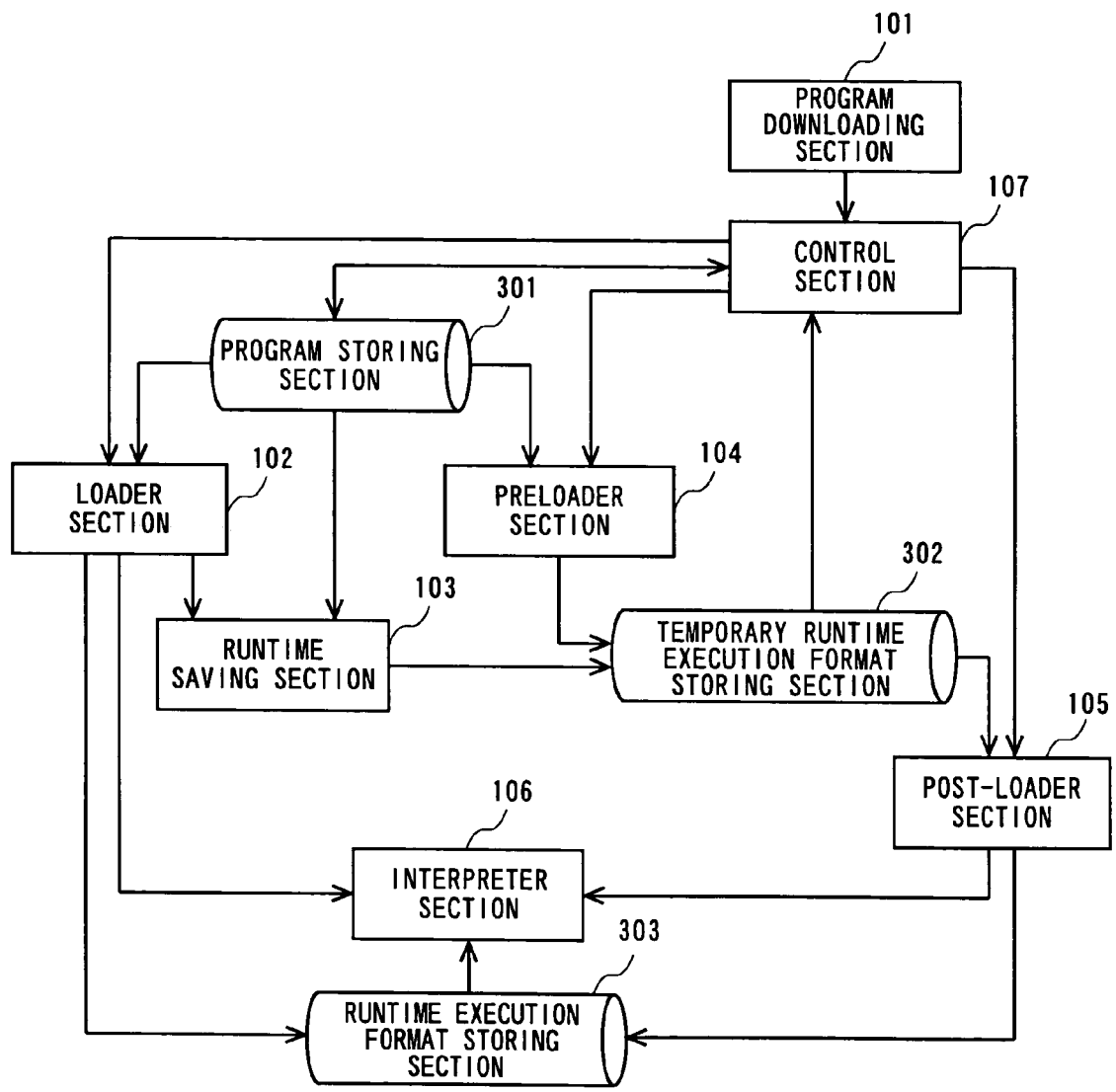

FIG. 4

STRUCTURE OF PROGRAM 201
(Java (TM) CLASS FILE FORMAT)

```
ClassFile {
        u4 magic;        /* PREFIX DATA REPRESENTING CLASS FILE */
        u2 minor_version;  /* PREFIX DATA REPRESENTING CLASS FILE VERSION */
        u2 major_version;  /* PREFIX DATA REPRESENTING CLASS FILE VERSION */
        u2 constant_pool_count;
        /* CONSTANT POOL ENTRY NUMBER */
        cp_info constant_pool[constant_pool_count-1];
        /* CONSTANT POOL ENTRY ARRAY */
        u2 access_flags;  /* VALUE REPRESENTING ATTRIBUTE */
        u2 this_class;   /* REFERENCE VALUE FOR CONSTANT POOL */
        u2 super_class;  /* REFERENCE VALUE FOR CONSTANT POOL */
        u2 interfaces_count;  /* INTERFACE ENTRY NUMBER */
        u2 interfaces[interfaces_count];
        /* INTERFACE ENTRY ARRAY */
        u2 fields_count;  /* FIELD ENTRY NUMBER */
        field_info fields[fields_count];
        /* FIELD ENTRY ARRAY */
        u2 methods_count;  /* METHOD ENTRY NUMBER */
        method_info methods[methods_count];
        /* METHOD ENTRY ARRAY */
        u2 attributes_count;  /* ATTRIBUTE ENTRY NUMBER */
        attribute_info attributes[attributes_count];
        /* ATTRIBUTE ENTRY ARRAY */
}
```

STRUCTURE OF RUNTIME EXECUTION FORMAT 203 (1)

<MEMORY IMAGE OF CLASS STRUCTURE>

CONTINUED TO FIG. 6

STRUCTURE OF TEMPORARY RUNTIME EXECUTION FORMAT 202 (1)

<MEMORY IMAGE OF CLASS STRUCTURE>

CONTINUED TO FIG. 8

| PROGRAM NAME | NUMBER OF START-UPS SO FAR RECORDED | LAST START-UP TIME |
|---|---|---|
| Maze | 5 | 2002/02/15 12:20 |
| 3D Dog | 2 | 2001/12/28 16:56 |
| Pazzle | 10 | 2002/03/10 07:45 |
| Schedule | 23 | 2002/03/09 23:02 |
| MemoPad | 17 | 2002/03/10 09:30 |
| Painter | 0 | — |
| ⋮ | ⋮ | ⋮ |

FIG. 23

| CONDITION NUMBER | PRELOADING PROCESS START CONDITION | OBJECT PROGRAM ID |
|---|---|---|
| 01 | START PROCESS BY TIMER AFTER STANDBY STATE CONTINUES FOR PREDETERMINED TIME PERIOD | "ScreenSaver" |
| 02 | START PROCESS WHEN IT IS RECOVERED FROM STANDBY STATE | "WakeUp" |
| 03 | START PROCESS WHEN CLOCK REACHES PREDETERMINED TIME | "Alerm" |
| 04 | START PROCESS WHEN POWER IS TURNED ON | "WakeUp" |
| 05 | START PROCESS WHEN MOBILE PHONE IS CHANGED FROM OPEN STATE→CLOSED STATE | "ScreenSaver" |
| 06 | START PROCESS WHEN MOBILE PHONE IS CHANGED FROM CLOSED STATE→OPEN STATE | "WakeUp" |
| 07 | START PROCESS DURING VOICE CALL | "Voice Navigator" |
| 08 | START PROCESS WHEN DATA COMMUNICATION USING HTTP IS STARTED | "HTTP ComManager" |
| 09 | START PROCESS WHEN IrDA-COMPLIANT DATA COMMUNICATION IS STARTED | "IrDA ComManager" |
| 10 | START PROCESS WHEN SD CARD IS INSERTED INTO MOBILE PHONE | "SD Record Manager" |
| 11 | START PROCESS WHEN SD CARD IS REMOVED FROM MOBILE PHONE | "SD Record Manager" |
| 12 | START PROCESS WHEN Bluetooth COMMUNICATION UNIT IS ATTACHED TO MOBILE PHONE | "BT ComManager" |
| 13 | START PROCESS WHEN EXECUTION OF MAILER APPLICATION OF MOBILE PHONE IS STARTED | "My Address" |
| 14 | START PROCESS WHEN EXECUTION OF BROWSER APPLICATION OF MOBILE PHONE IS ENDED | "URL Profiler" |
| 15 | START PROCESS WHEN INTERNAL STATE a CHANGES INTO INTERNAL STATE b | "Free MemoPad" |
| 16 | START PROCESS WHEN INTERNAL STATE c CHANGES INTO INTERNAL STATE d | "16 Pazzle" |
| ⋮ | ⋮ | ⋮ |

PROGRAM EXECUTION PROCESSING TERMINAL DEVICE, PROGRAM EXECUTION PROCESSING METHOD, AND PROGRAM

TECHNICAL FIELD

The present invention relates to information terminal devices, program execution processing methods, and programs for performing an interpretation execution process for a received program, particularly, relates to an information terminal device, a program execution processing method, and a program by which quick start-up of a program is realized.

BACKGROUND ART

In recent years, data distribution service utilizing a communication function of a portable information terminal typified by a mobile phone, a PHS (Personal Handyphone System), and a PDA (Personal Digital Assistance) is widely available.

As a typical example, there is a distribution service of content such as an image and a melody signaling an incoming mail. It is also possible to download a program, not just data, for executing it as an application on the portable information terminal. That is, by downloading a program, it is possible to use newly added various functions, not just functions (applications) originally installed in the portable information terminal.

By the above-described program distribution service, a PIM (Personal Information Manager) application such as an electric telephone directory and an electric schedule book, and a game application, for example, are supplied. A user can freely select an application having a desired function, an easy-to-use user interface, or a favorite screen structure, and download the program, thereby using the selected application.

Java (™) is promising software architecture to realize a program distribution mechanism. Java (™), which includes a virtual machine mechanism, is able to operate a program independent of hardware and an OS of a machine, thereby being considered effective architecture, not just in a computing field such as a workstation and a personal computer (hereinafter, referred to as a PC for short), but for a household electrical appliance.

Also, as for the portable information terminal, there have already been various models in which the Java (™) virtual machine is installed, and the program distribution service has started. In future, further popularization of the virtual machine mechanism-based program distribution service is to be expected.

However, what becomes a problem when executing the downloaded application on the portable information terminal using the virtual machine mechanism is a length of start-up time.

Here, the start-up time means a time elapsed from when the user or other application (e.g., a browser, a mailer, or a telephone) installed in the portable information terminal gives an instruction to the virtual machine in the portable information terminal to start interpretation execution of a specific application to when an initial screen of the application, which is instructed to be started, is output to a display screen of the portable information terminal. That is, the start-up time is a latency time before the application is enabled, and therefore an unnecessary time for the user because he/she does not use the application during all that time, whereby the longer the start-up time becomes, the less an application execution efficiency becomes.

For example, a start-up process of a typical Java (™) virtual machine is composed of the following three main processes. Hereinafter, Java (™) will be used for descriptions, but the first thing to be described is that other virtual machine can be used instead.

(1) initialization process
(2) class verification process
(3) class loading process Details of each process are described in a reference (Tim Lindholm and Frank Yellin: "The Java (™) Virtual Machine Specification", Addison-Wesley, 1997). Hereinafter, only an outline of the process required for the following descriptions will be described.

In Java (™), a program is composed of one or more files called class files. When the program is downloaded, the class files are supplied, in general, packaged in one file, which is decompressed; after downloading, as one or more class files, which are stored as files in the portable information terminal.

(1) The initialization process is an initialization operation required for enabling execution of the Java (™) virtual machine. Specifically, a process for reserving a memory area (e.g., a Java heap area) used by the virtual machine, an initialization of a garbage collection process, an initialization of a class loader, and an initialization of thread management, for example, are performed.

(2) The class verification process is a process performed for verifying security of a program to be executed. Specifically, a format of a class file is checked, and a byte code, for example, included in the class file is checked whether to be compliant with Java (™) specifications.

(3) The class loading process is a process for decompressing a class file on the memory area used by the virtual machine as a storage format (hereinafter, referred to as a runtime execution format) executable by the Java (™) virtual machine. The object class file includes a class file having a main method, which is the first execution method of the program to be executed, and all class files which can be traced based on the above-described class file.

Due to the above-described processes, the start-up time of the application utilizing the virtual machine mechanism is longer than that required for starting an application (native application) written in a machine language of the portable information terminal.

As for the start-up time of (2) the class verification process and (3) the class loading process, in general, the greater an application (program) size becomes, the longer a time required by the process becomes, whereby application execution efficiency is reduced. Especially, user-friendliness of an application such as a PIM application, which requires frequent start-ups, can be substantially reduced.

On the other hand, a technique for enhancing application execution efficiency by performing some type of process for a Java (™) processing class file format is disclosed in Japanese Patent Laid-Open Publication No. 2000-29706 gazette "method and device for preprocessing and packaging of class file", and Japanese Patent Laid-Open Publication No. H11-327906 gazette "static connection of call dynamically dispatched in the presence of dynamic linking and dynamic loading".

However, the techniques disclosed in the above-described Japanese Patent Laid-Open Publication No. 2000-29706 gazette and Japanese Patent Laid-Open Publication No. H11-327906 gazette are both designed for speeding up of interpretation execution speed of an application and efficient use of a memory, and are not designed for realizing reduction of a start-up time, which often becomes problems in a case where a processing system such as Java (™) is applied to a household information electrical appliance such as a mobile phone whose price and size, etc., are severely constrained regarding hardware resources.

In order to solve the above-described problems, the present invention is designed to reduce a program start-up time by dividing (3) the class loading process included in the start-up process into "a class loading process necessary for a start-up of an application for the first time" and "a class loading process necessary for a start-up of the application for the second and subsequent times", and storing the processing results of the "first-time class loading process" as a record format (hereinafter, a temporary runtime execution format) different from a class file format, whereby only the "second-and-subsequent-time class loading process" is required at a start-up of the program.

DISCLOSURE OF THE INVENTION

To achieve the above objects, a program execution processing terminal device of the present invention includes: a loader section for converting a program from a Java (™) class file to a runtime execution format; a temporary runtime execution format storing section for storing a temporary runtime execution format generated based on the runtime execution format converted by the loader section, or a program stored in a program storing section; and a post-loader section for performing a postloading process for converting the temporary runtime execution format stored in the temporary runtime execution format storing section to a runtime execution format, determines whether or not there is a temporary runtime execution format in the temporary runtime execution format storing section when a start-up of a program is instructed, requests the loader section to perform conversion to a runtime execution format if there is none, and requests the post-loader section to perform conversion to a runtime execution format if there is any.

Note that a temporary runtime execution format may be obtained by converting the runtime execution format converted by the loader section to a temporary runtime execution format. As such, when a program is started-up for the first time, a normal loading process is performed, and a runtime saving process is performed after the loading process for generating a temporary runtime execution format, whereby a postloading process, by which a runtime execution format is generated from a temporary runtime execution format, can be replaced with a normal loading process when the program is started-up for the second time and subsequent times, thereby reducing a processing time required for a program start-up for the second time and subsequent times.

Also, a temporary runtime execution format may be obtained by converting a program stored in the program storing section to a temporary runtime execution format. As such, a preloading process is previously performed for a program for generating a temporary runtime execution format, whereby a postloading process can be replaced with a normal loading process in the first program start-up, thereby reducing a processing time required for a program start-up.

Also, a program execution processing method of the present invention includes: a program storing step of storing a received program in a program storing section; a loading step of converting the program stored in the program storing section to a runtime execution format; a converting step of converting the runtime execution format converted in the loading step, or the program stored in the program storing section to a temporary runtime execution format; a temporary runtime execution format storing step of storing the temporary runtime execution format converted in the converting step in a temporary runtime execution format storing section; a determining step of determining whether or not there is a temporary runtime execution format in the temporary runtime execution format storing section when a start-up of a program is instructed; a postloading step of converting, if there is a temporary runtime execution format in the temporary runtime execution format storing section as a result of the determination in the determining step, the temporary runtime execution format stored in the temporary runtime execution format storing section to a runtime execution format; and an interpreting step of performing interpretation execution for the runtime execution format converted in the postloading step.

Also, a program of the present invention causes a computer to execute the above-described program execution processing method. This program may be supplied to a computer such as an information terminal device as being stored in a computer readable storage medium, or may be supplied to a computer such as an information terminal device via a communication line.

BRIEF DESCRIPTION OF THE DRAWINGS

FIG. 2 is a block diagram showing a structure of a program execution processing terminal device according to an embodiment of the present invention.

FIG. 4 is an illustration showing an exemplary structure of a program according to an embodiment of the present invention.

FIG. 23 is an illustration showing an exemplary preloading process correspondence table according to an embodiment of the present invention.

BEST MODE FOR CARRYING OUT THE INVENTION

Hereinafter, embodiments of the present invention will be described in detail using drawings.

First Embodiment

A program download service using a portable information terminal, in which a Java (™) mechanism is utilized, has already been widely available, whereby the present invention can be realized by extending the above mechanism. In the present embodiment, descriptions will be performed with appropriately referring to an embodiment in the case where the Java (™) mechanism is used.

Figure 1:
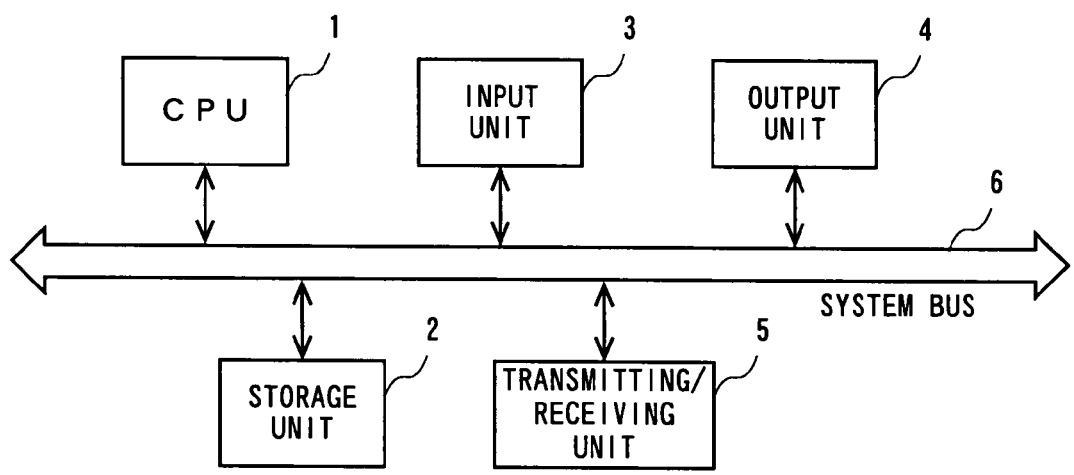
FIG. 1 is a hardware structure of a portable information terminal according to an embodiment of the present invention.

FIG. 1 is a hardware structure of a portable information terminal according to a first embodiment of the present invention. In FIG. 1, a central processing unit (CPU) 1, a storage unit 2, an input unit 3, an output unit 4, and a transmitting/receiving unit 5 are included, and they are connected to each other via a system bus 6.

The storage unit 2 is composed of a ROM, a RAM, and a hard disk, etc., and is used as a storage area to be used when the CPU 1 performs a process, or an area for storing a program itself. The input unit 3 is composed of a keyboard, a key button, a mouse, and a microphone, etc., for performing an input operation for an instruction by a user. The output unit 4, which is composed of a display device such as a display and a loudspeaker, etc., performs a process such as displaying data output from the CPU 1 on a screen and reproducing audio data. The transmitting/receiving unit 5 performs data communications via a wireless or wire transmission path, and the CPU 1 can download data, for example, a program, from an external device (not shown) via the transmitting/receiving unit 5.

FIG. 2 is a block diagram showing a structure of a program execution processing terminal device of the present embodiment. The program execution processing terminal device includes a program downloading section 101, a loader section 102, a runtime saving section 103, a preloader section 104, a post-loader section 105, an interpreter section 106, a control section 107, a program storing section 301, a temporary runtime execution format storing section 302, and a runtime execution format storing section 303.

The program downloading section 101 receives a program from a program distribution source, and stores the received program in the program storing section 301 via the control section 107. The program downloading section 101 can be realized using a download system of a program installed in a conventional portable information terminal.

The loader section 102 converts the program stored in the program storing section 301 to a runtime execution format in accordance with a request from the control section 107, and stores it in the runtime execution format storing section 303. Also, the interpreter section 106 is notified of a start of program execution. Further, after notifying the runtime saving section 103 of the converted runtime execution format, a runtime saving process is requested.

In accordance with the request from the loader section 102, the runtime saving section 103 converts the runtime execution format stored in the runtime execution format storing section 303 to a temporary runtime execution format, and stores it in the temporary runtime execution format storing section 302.

In accordance with a request from the control section 107, the preloader section 104 converts the program stored in the program storing section 301 to a temporary runtime execution format, and stores it in the temporary runtime execution format storing section 302.

The post-loader section 105 converts the temporary runtime execution format stored in the temporary runtime execution format storing section 302 to a runtime execution format, and stores it in the runtime execution format storing section 303. Also, the interpreter section 106 is notified of a start of program execution.

In accordance with an execution start notification from the loader section 102 or the post-loader section 105, the interpreter section 106 performs interpretation execution for the runtime execution format stored in the runtime execution format storing section 303. In the case where the Java (™) mechanism is used, the above-described interpreter section 106 can be realized using a conventional Java (™) virtual machine.

When a program start-up is instructed, the control section 107 determines whether or not there is a temporary runtime execution format of a program to be stated up in the temporary runtime execution format storing section 302, requests the loader section 102 to perform conversion to a runtime execution format if there is none, and requests the post-loader section 105 to perform conversion to a runtime execution format if there is any. What is needed to convert a temporary runtime execution format to a runtime execution format is to copy a greater portion of data, and to convert indirect reference representation address data to actual data, which will be described below, and therefore a processing time is shorter compared to a case where a program is converted to a run time execution format. Thus, it is possible to reduce a start-up time of a program whose runtime execution format has already been stored.

The program storing section 301 stores the program received by the program downloading section 101 from the program distribution source. Note that, if the program is realized by a nonvolatile memory typified by a flash memory, or the like, that is, a device in which a record is retained even if power of the portable information terminal is turned OFF, it is possible to prevent re-downloading of a program in the case where the power of the portable information terminal is turned OFF. Also, in addition to downloading a program, a specific program may be previously stored. Further, the previously stored program may be fixed by using a memory such as a ROM from which stored data cannot be erased.

The runtime execution format storing section 303 stores the runtime execution format converted by the loader section 102 or the post-loader section 105. The runtime execution format is preferably realized by a storage device capable of fast access because it is a storage area to be directly accessed by the interpreter section 106 as an object for which interpretation execution is performed. For example, a volatile memory such as a RAM is used therefor.

The temporary runtime execution format storing section 302 stores the temporary runtime execution format converted by the runtime saving section 103. The temporary runtime execution format storing section 302 may be volatile or non-volatile. In order to realize reduction of a program start-up time, it is preferable to use a storage device whose data access speed is faster compared to one used for realizing the program storing device 301. Note that it is preferable to use a nonvolatile memory such as a flash memory, for example, as the temporary runtime execution format storing section 302 because the temporary runtime execution format, which is stored in the temporary runtime execution format storing section 302 immediately before a power of the portable information terminal is turned off, can be used when a power is turned on after power off.

Note that, in the present embodiment, it is assumed that the runtime saving section 103 and the preloader section 104 are included, but the present invention is not limited thereto. That is, it may be provided with only either one. As is the case with the present embodiment, also in this case, it is possible to reduce a program start-up time.

Figure 3:
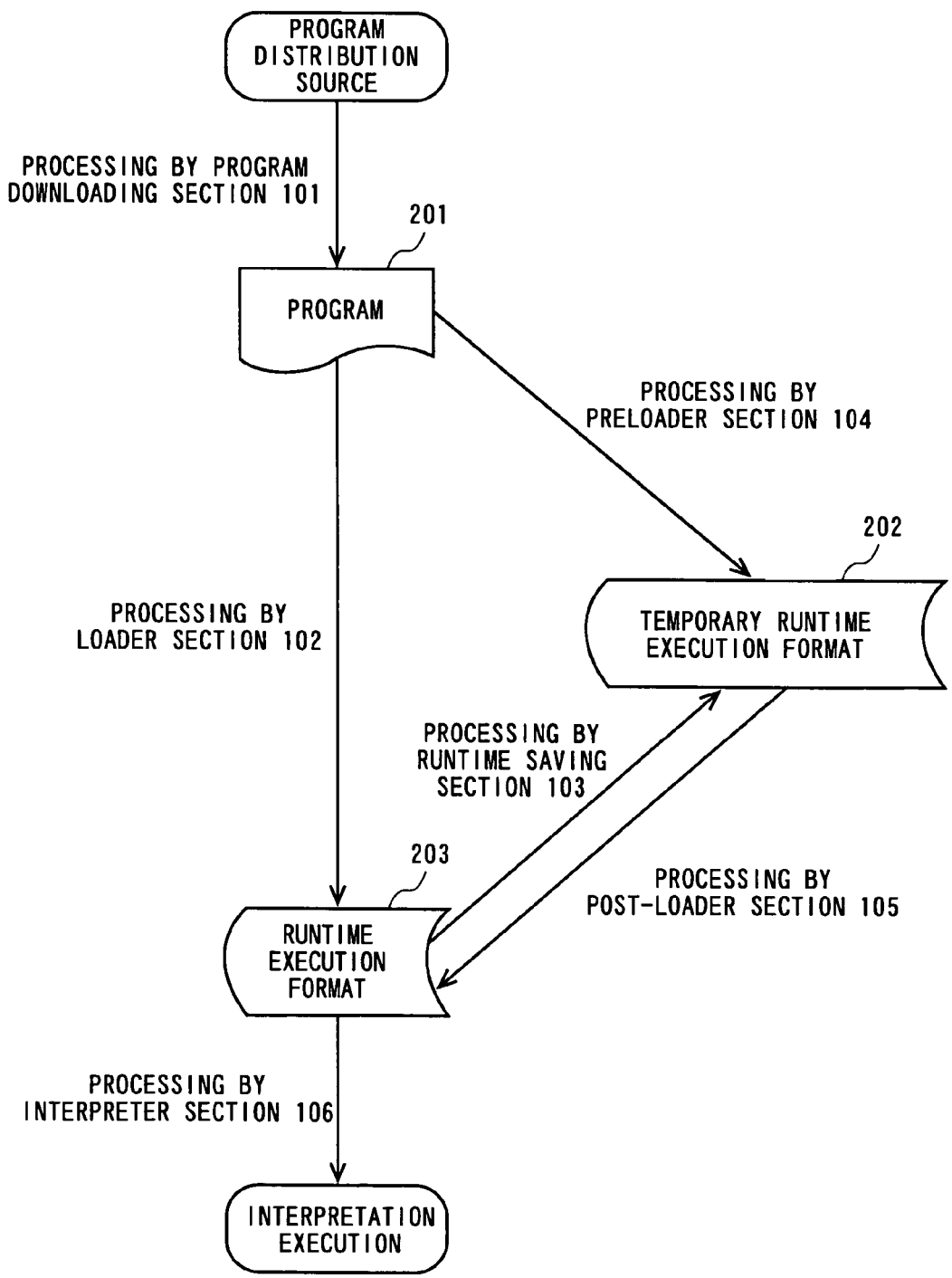
FIG. 3 is a relational diagram of data conversion during a class loading process according to an embodiment of the present invention.

FIG. 3 is an illustration showing an exemplary data flow performed in the following processing section: the loader section 102, the runtime saving section 103, the preloader section 104, and the post-loader section 105. It shows a flow of data conversion from when a program 201 is downloaded from the program distribution source to when interpretation execution is performed for a runtime execution format 203.

First, the program 201 transmitted from the program distribution source is received by the program downloading section 101, and is stored in the program storing section 301.

Next, when a start-up of the program 201 is instructed, the loader section 102 converts the program 201 to the runtime execution format 203 in accordance with an instruction from the control section 107, and the interpreter section 106 performs interpretation execution for the runtime execution format 203. At the same time, the runtime saving section 103 converts the runtime execution format 203 to a temporary runtime execution format 202, and stores it in the temporary runtime execution format storing section 302. When a start-up of the program 201 is instructed again, the post-loader section 105 converts the temporary runtime execution format 202 to the runtime execution format 203, and the interpreter section 106 performs interpretation execution for the runtime execution format 203.

Also, a flow of data conversion in the case where a preloading process is performed will be described below. The preloader section 104 converts the program 201 to the temporary runtime execution format 202, and stores it in the temporary runtime execution format storing section 302. When a start-up of the program 201 is instructed, the post-loader section 105 converts the temporary runtime execution format 202 to the runtime execution format 203 in accordance with the instruction from the control section 107, and the interpreter section 106 performs interpretation execution for the runtime execution format 203.

FIGS. 4 to 8 show an exemplary structures of the program 201, the runtime execution format 203, and the temporary runtime execution format 202 described in FIG. 3. Hereinafter, they will be described in sequential order.

The program 201 can be obtained as data having a format for which a mobile phone can perform interpretation execution. In the case where the Java (™) mechanism is applied to the mobile phone, a class file, which is a Java (™) execution format, is downloaded as the program 201.

One example of the structure of the program 210 is shown in FIG. 4. FIG. 4 is a C language-based structure representation of data content stored in the program 201. U1, u2, and u4 types represent unsigned 1 byte, 2 bites, and 4 bytes data size, respectively. In Java (™), the program 201 is, in general, composed of more one or more class files, and all class files have the same class file structure. The structure of the class file is described in detail in a reference (Tim Lindholm and Frank Yellin: "The Java (™) Virtual Machine Specification", Addison-Wesley, 1997). In FIG. 4, only the most significant structure is shown.

Figure 5:
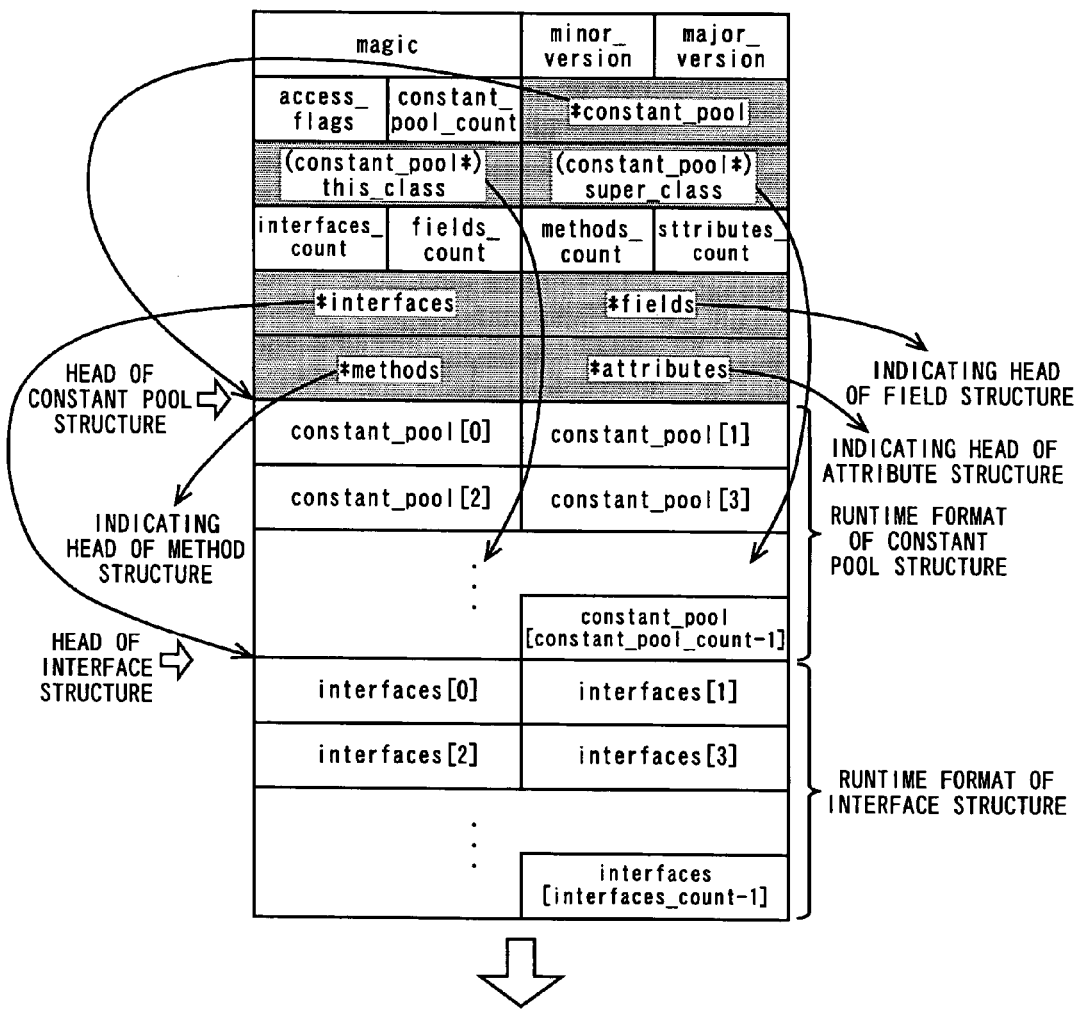
FIG. 5 is an illustration showing an exemplary structure of a runtime execution format according to an embodiment of the present invention.
Figure 6:
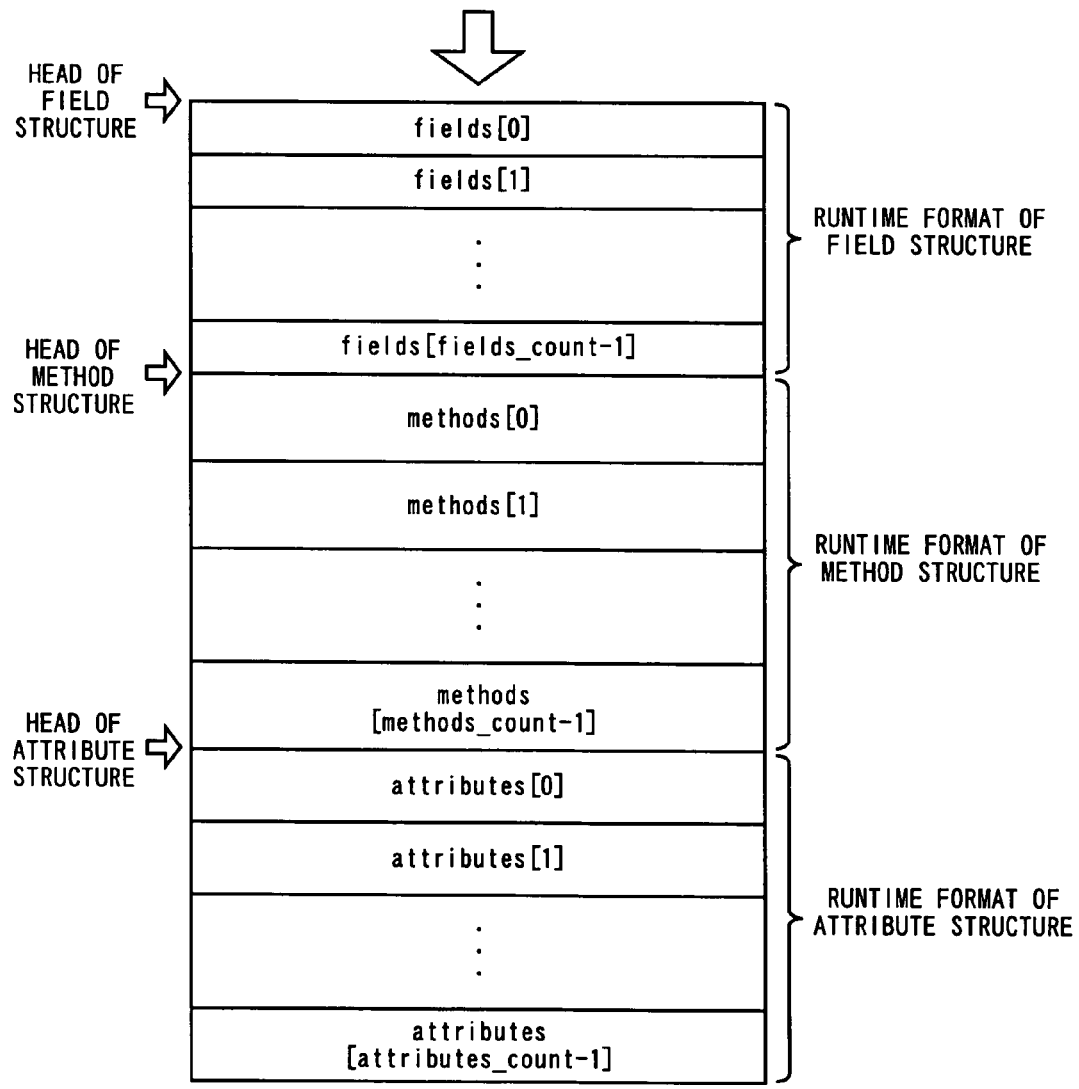
FIG. 6 is an illustration showing an exemplary structure of a runtime execution format according to an embodiment of the present invention.

Next, one example of the structure of the runtime execution format 203 is shown in FIGS. 5 and 6. The runtime execution format 203 is realized as a sequential memory image stored in the runtime execution format storing section 303. As described above, a format itself of a class file is defined, but a format of a runtime format is not defined because it is dependent on implementation of the Java (™) virtual machine.

In FIGS. 5 and 6, the runtime execution format 203 is shown as a memory image in units of class. An actual program of Java (™) is often composed of two or more class files, and in that case, similar memory images are generated according to the number of class files. The memory image representing a class includes a runtime format having a constant pool structure, a runtime format having an interface structure, a runtime format having a field structure, a runtime format having a method structure, and a runtime format having an attribute structure, which are further lower structures.

Data shown in a white box in the memory image of FIGS. 5 and 6 indicates that a value of data with the same name shown in FIG. 4 is directly recorded therein. Shaded data in the memory image of FIGS. 5 and 6 represents that the data is a reference value (pointer) indicating an address of another data storage location in the memory image. The followings are details.

"constant_pool" is a pointer indicating a head of a runtime format having a constant_pool structure, "(constant_pool this_class" and "(constant_pool) super_class" are pointers indicating an address of an entry in the constant pool structure, "interfaces" is a pointer indicating a head of a runtime format having an interface structure, "fields" is a pointer indicating a head of a runtime format having a field structure, "methods" is a pointer indicating a head of a runtime format having a method structure, and "attributes" is a pointer indicating a head of a runtime format having an attribute structure.

Note that a pointer value does not necessarily indicate a structure in the memory image of the same class in which the pointer is included, and it may indicate a structure of a memory image of another class.

The memory image of the runtime execution format 203 includes a pointer, and a value of this pointer is not set to a fixed value at the time of generation of a memory image (because a pointer value changes in accordance with a location of the memory image in the runtime execution format storing section 303).

More specifically, other than the pointers described in FIGS. 5 and 6, a pointer value may be included in data of an entry in the constant pool structure, an entry in the interface structure, an entry in the field structure, an entry in the method structure, and an entry in the attribute structure, but they are omitted in the present descriptions.

Figure 7:
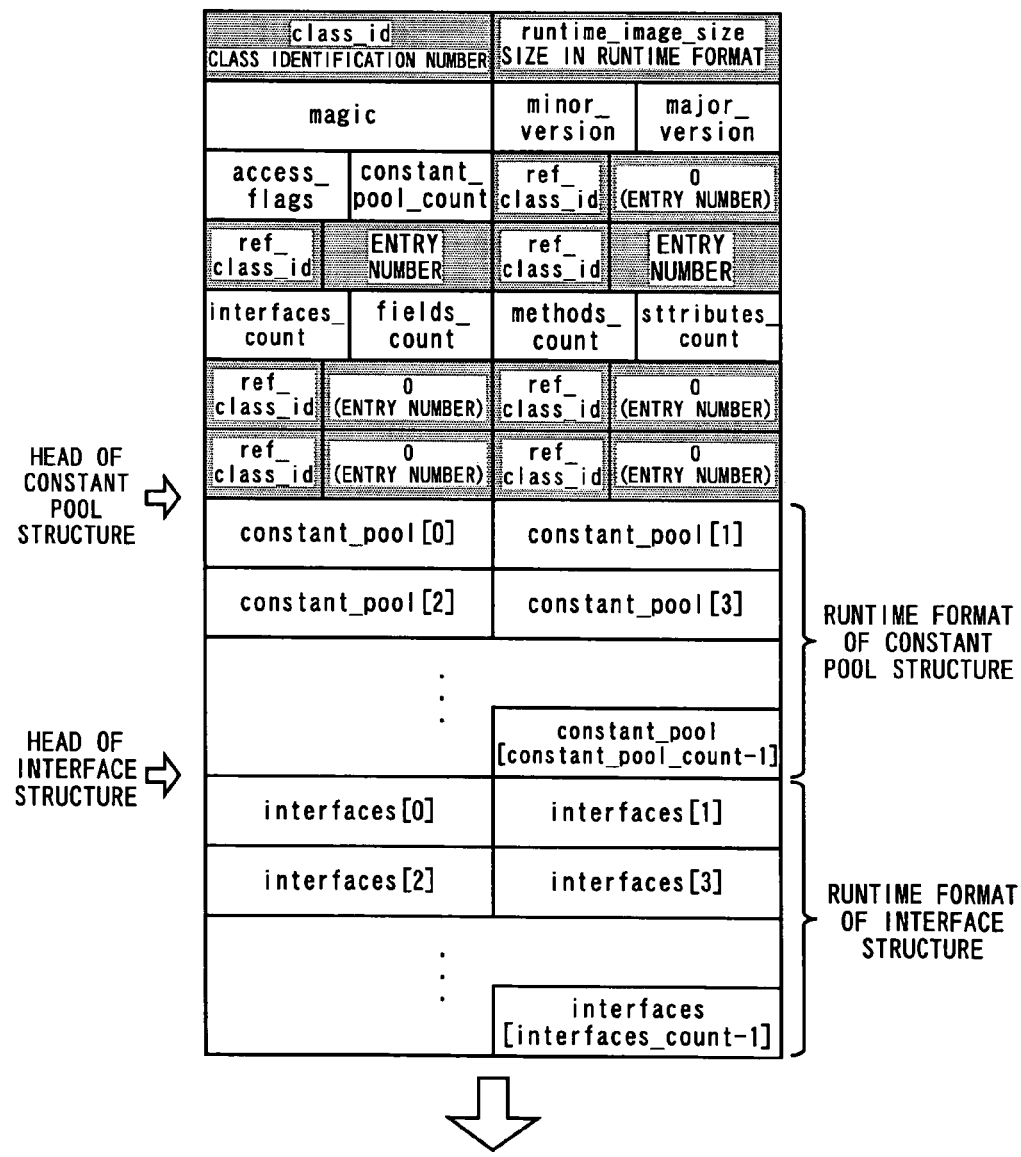
FIG. 7 is an illustration showing an exemplary structure of a temporary runtime execution format according to an embodiment of the present invention.
Figure 8:
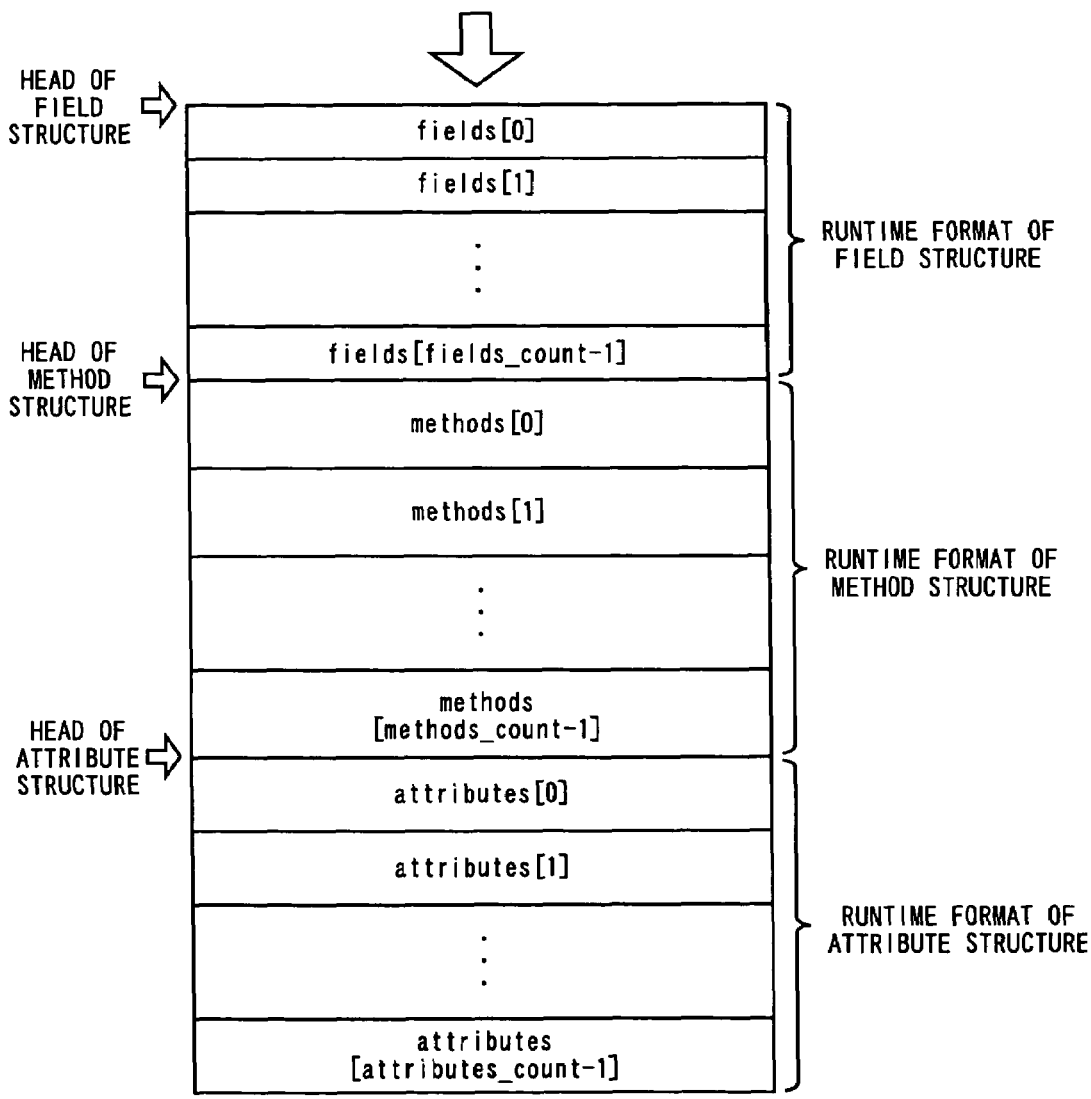
FIG. 8 is an exemplary structure of a temporary runtime execution format according to an embodiment of the present invention.

Next, one example of the structure of the temporary runtime execution format 202 is shown in FIGS. 7 and 8. The temporary runtime execution format 202 is stored in the temporary runtime execution format storing section 302. It may be recorded as a memory image or as a file containing a byte string of data, and it is represented here as a memory image as is the case with FIGS. 5 and 6. What is shown here is one example of implementation of the temporary runtime execution format 202 corresponding to the embodiment of the runtime execution format 203 as shown in FIGS. 5 and 6.

Compared to FIGS. 5 and 6, the following data is newly added to a head in the memory image of FIGS. 7 and 8.

"Class_id" is identification data (a class identification number) uniquely assigned to the memory image in units of class. In the case where a memory image with a plurality of classes is generated, a value of the class_id should not be redundant. "runtime image_size" records a memory size of a runtime execution format generated from the temporary runtime execution format.

Also, the memory image of FIGS. 7 and 8 differs from FIGS. 5 and 6 in that it does not contain a pointer value. All data represented as a pointer in FIGS. 5 and 6 is converted to a combination of following two pieces of data (a shaded portion in FIGS. 7 and 8).

"Ref_class_id" designates a class identification number. This subsequent data is always followed by an entry number. The "entry number" indicates an entry number of data in the constant pool structure/interface structure/field structure/method structure/attribute structure.

In the embodiment of the temporary runtime execution format 202, all portions to be represented as a pointer in the runtime execution format 203 are converted to a form (indirect reference representation) of "class ID"+"entry number", and stored.

As mentioned above, a pointer representation in the runtime execution format 203 may sometimes indicate a structure of a memory image of another class. In order to identify to which memory image class it belongs, the entry number is always represented as being combined with class_id.

A pointer is not included in the memory image of the temporary runtime execution format 203, whereby it is set to a unique data string at the time of generation of the memory image independently of a location of the memory image in the temporary runtime execution format storing section 302. That is, a recording content of a temporary runtime execution format representing a certain class remains always unique.

The structure of each data format has been described in the above descriptions.

Next, a processing operation performed by each processing section shown in the block diagram of FIG. 2 will be described.

Figure 9:
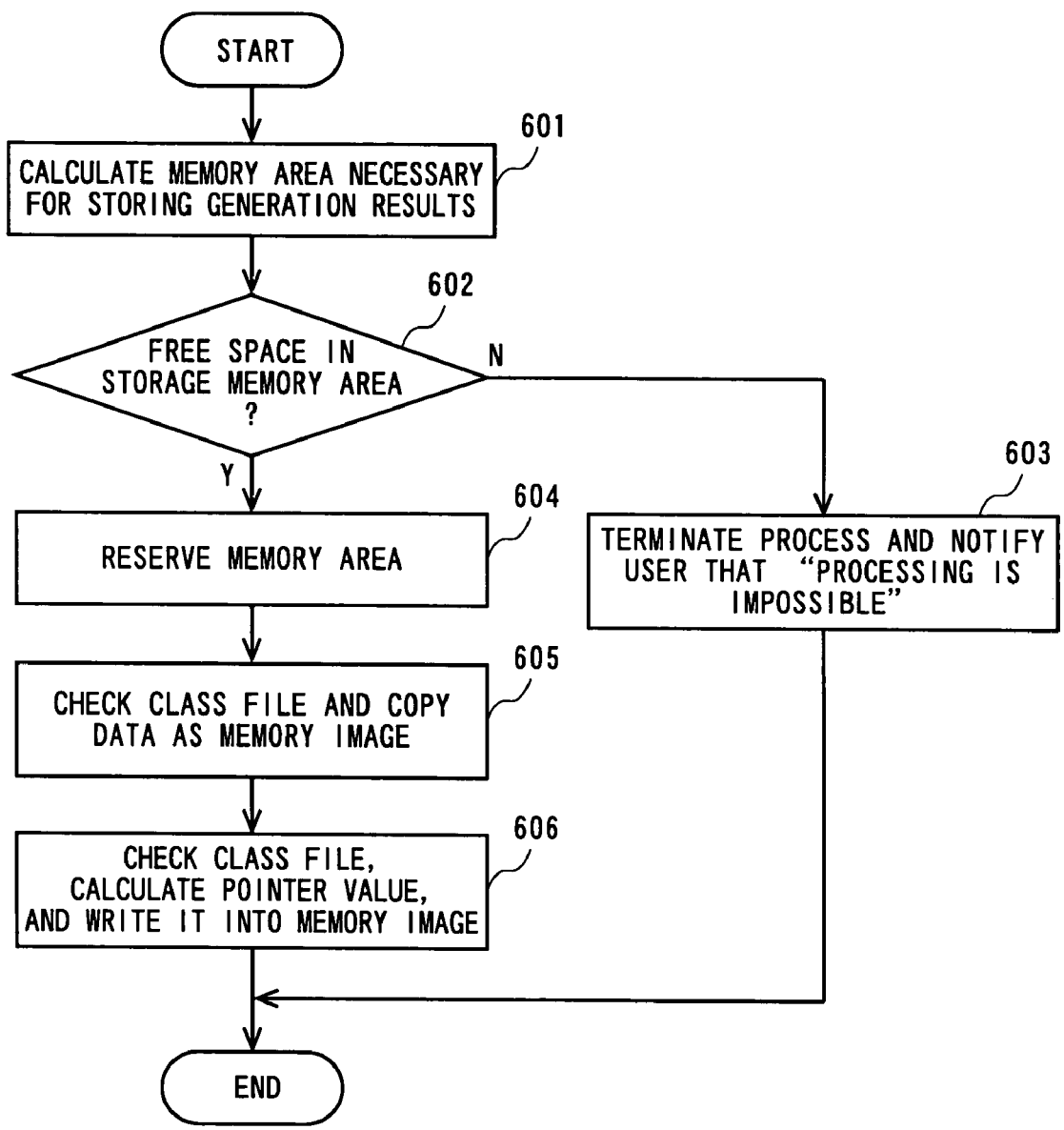
FIG. 9 is a flowchart showing an exemplary operational procedure of a loader section according to an embodiment of the present invention.

FIG. 9 shows one example of a flow of a data conversion process in the loader section 102.

First, memory usage of the runtime execution format 203 generated by the loader section 102 is calculated (step 601). It can be calculated based on a value indicating the entry number of each structure, such as constant_pool_count, interfaces_count, fields_count, methods_count, and attributes_count, and a size of each entry of each structure, after checking a class file included in the program 201.

Based on the value calculated in step 601, the runtime execution format storing section 303, which is a storage location of the runtime execution format 203, is checked whether or not there is free space in a storage memory area (step 602). If there is no free space (N in step 602), determination is made that continuation of the data conversion process by the loader section 102 is impossible, the loading process itself is terminated, a user is notified that a start-up of the program is impossible, thereby ending the process (step 603). On the other hand, if there is free space (Y in step 602), a memory area corresponding to the value calculated in step 701 is reserved in the runtime execution format storing section 303 (step 604).

Next, the class file is checked, and data is stored in the runtime execution format storing section 303 by copying data other than a portion represented as a pointer value in the runtime execution format 203 (step 605). It corresponds to data represented as a white box in the memory image of FIGS. 5 and 6.

Finally, data represented as a pointer value in the runtime execution format 203 is calculated, and the calculated data is stored in the runtime execution format storing section 303, thereby ending the conversion from the program 201 to the runtime execution format 203 (step 606). It corresponds to data represented as a shaded box in the memory image of FIGS. 5 and 6.

Figure 10:
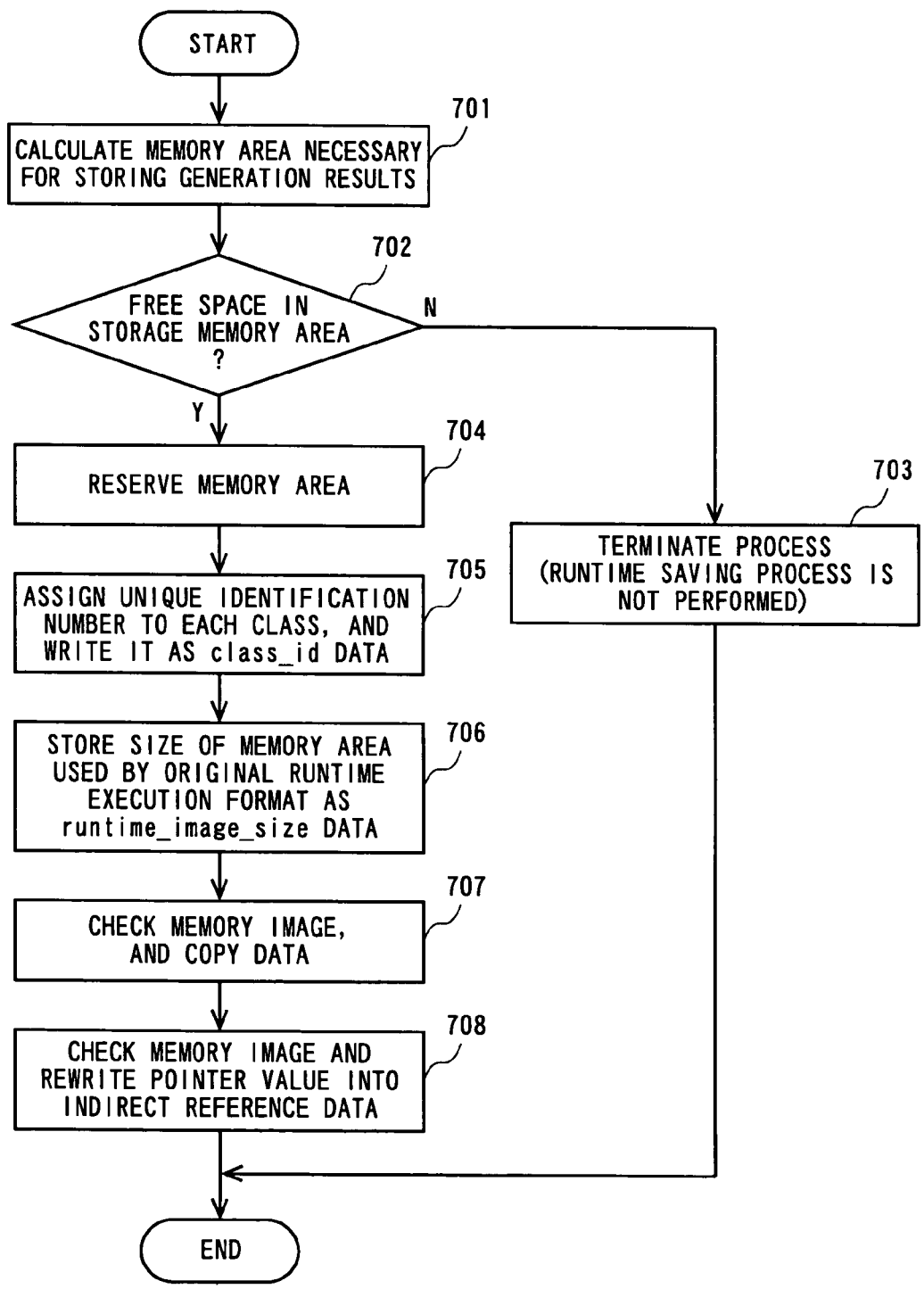
FIG. 10 is a flowchart showing an exemplary operational procedure of a runtime saving section according to an embodiment of the present invention.

FIG. 10 shows one example of a flow of a data conversion process in the runtime saving section 103.

First, memory usage of the temporary runtime execution format 202 generated by the runtime saving section 103 is calculated (step 701). It can be calculated based on a value indicating the entry number of each structure, such as constant_pool_count, interfaces_count, fields_count, methods_count, and attributes_count, and a size of each entry of each structure, after checking the runtime execution format 203.

Based on the value calculated in step 701, the temporary runtime execution format storing section 302, which is a storage location of the temporary runtime execution format 202, is checked whether or not there is free space in a storage memory area (step 702). If there is no free space (N in step 702), determination is made that continuation of the data conversion process by the runtime saving section 103 is impossible, and the runtime saving process itself is terminated, thereby ending the process (step 703). On the other hand, if there is free space (Y in step 702), a memory area corresponding to the value calculated in step 601 is reserved in the temporary runtime execution format storing section 302 (step 704).

Next, identification numbers are assigned to all classes for which the runtime saving process is performed, and data is stored in the temporary runtime execution format storing section 302 as class_id data of the temporary runtime execution format 202 (step 705).

A value of memory size used by the runtime execution format 203, which is processing source data of the runtime saving process, in the runtime execution format storing section 303 for recording is calculated, and is stored in the temporary runtime execution format storing section 302 as runtime_image_size data of the temporary runtime execution format 202 (step 706).

The memory image of the runtime execution format 203 is checked, and data is stored in the temporary runtime execution format storing section 302 by copying data other than a portion represented as a pointer value in the runtime execution format 203 as data of the temporary runtime execution format (step 707). It corresponds to data represented as a white box in the memory image of FIGS. 7 and 8.

Finally, the memory image of the runtime execution format 203 is checked, conversion is performed for data represented as a pointer value in the runtime execution format 203, the converted data is stored in the temporary runtime execution format storing section 302, thereby ending the conversion from the runtime execution format 203 to the temporary runtime execution format 202 (step 708). The pointer value data is converted to "an identification number of a class including a structure indicated by the pointer" and "an entry number in the structure". It corresponds to data represented as a shaded box in the memory image of FIGS. 7 and 8 other than class_id and runtime_image_size.

Figure 11:
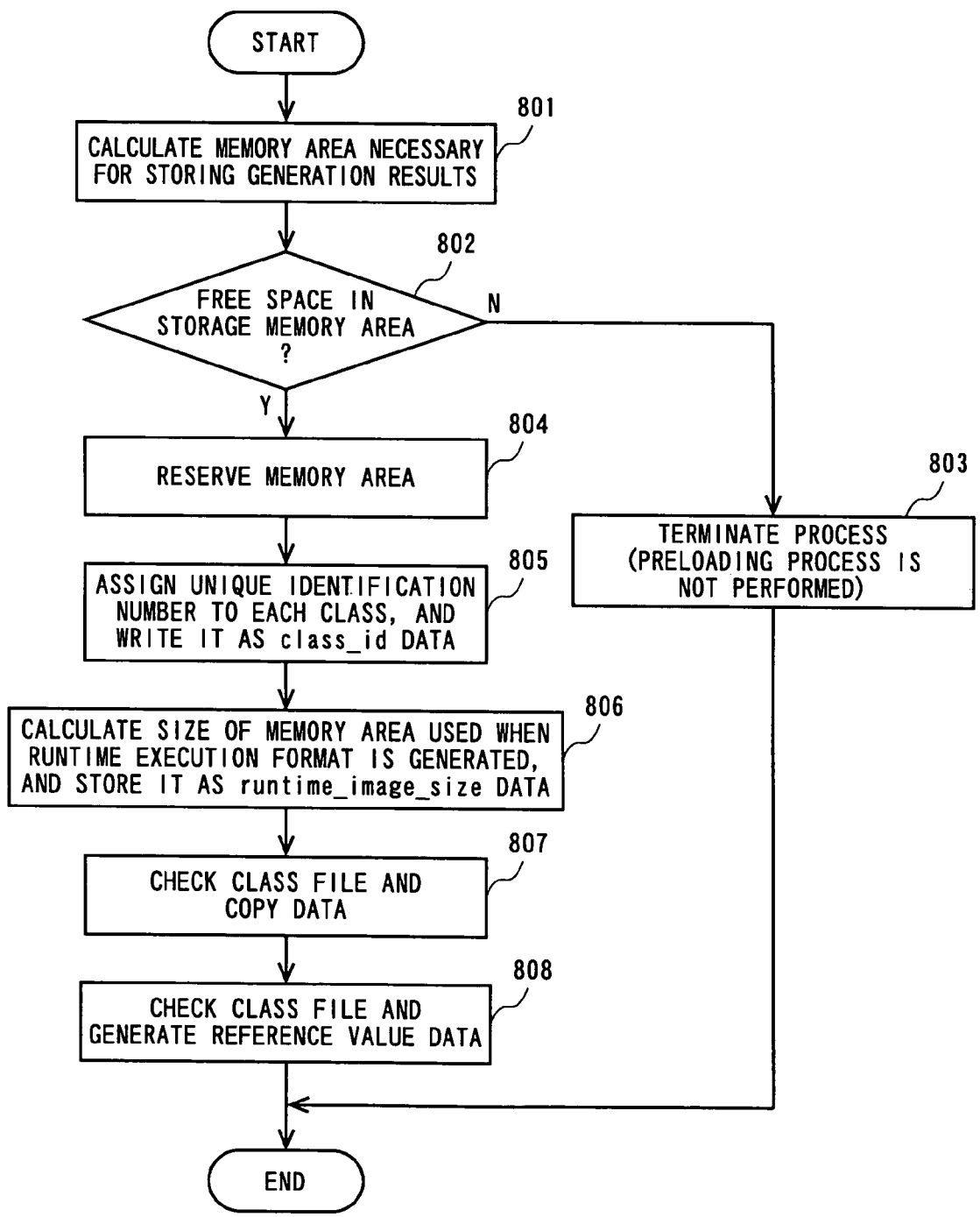
FIG. 11 is a flowchart showing an exemplary operational procedure of a preloader section according to an embodiment of the present invention.

FIG. 11 is one example of a flow of a data conversion process in the preloader section 104.

First, memory usage of the temporary runtime execution format 202 generated by the preloader section 104 is calculated (step 801). It can be calculated based on a value indicating the entry number of each structure, such as constant_pool_count, interfaces_count, fields_count, methods_count, and attributes_count, and a size of each entry of each structure, after checking an unprocessed class file.

Based on the value calculated in step 801, the temporary runtime execution format storing section 302, which is a storage location of the temporary runtime execution format 202, is checked whether or not there is free space in a storage memory area (step 802). If there is no free space (N in step 802), determination is made that continuation of the data conversion process by the preloader section 104 is impossible, the preloader process itself is terminated, thereby ending the process (step 803). On the other hand, if there is free space (Y in step 802), a memory area corresponding to the value calculated in step 801 is reserved in the temporary runtime execution format storing section 302 (step 804).

Next, identification numbers are assigned to all classes for which the preloading process is performed, and data is stored in the temporary runtime execution format storing section 302 as class_id data of the temporary runtime execution format 202 (step 805).

A value of memory size used by the runtime execution format 203 converted from the program 201, which is processing source data of the preloading process, and is stored in the temporary runtime execution format storing section 302 as runtime_image_size data of the temporary runtime execution format 202 (step 806).

The program 201 is checked, and data other than a portion represented as a reference value for another structure in the temporary runtime execution format 202 is copied as data of the temporary runtime execution format 202 (step 807). It corresponds to data represented as a white box in the memory image of FIGS. 7 and 8.

Finally, the program 201 is checked, and data corresponding to a portion represented as a reference value for another structure in the temporary runtime execution format 202 is converted to "an identification number of a class including a structure of a reference destination" and "an entry number in the structure", thereby ending the conversion from the program 201 to the temporary runtime execution format 202 (step 808).

It corresponds to data in a shaded box in the memory image of FIGS. 7 and 8 other than class_id and runtime_image_size.

Figure 12:
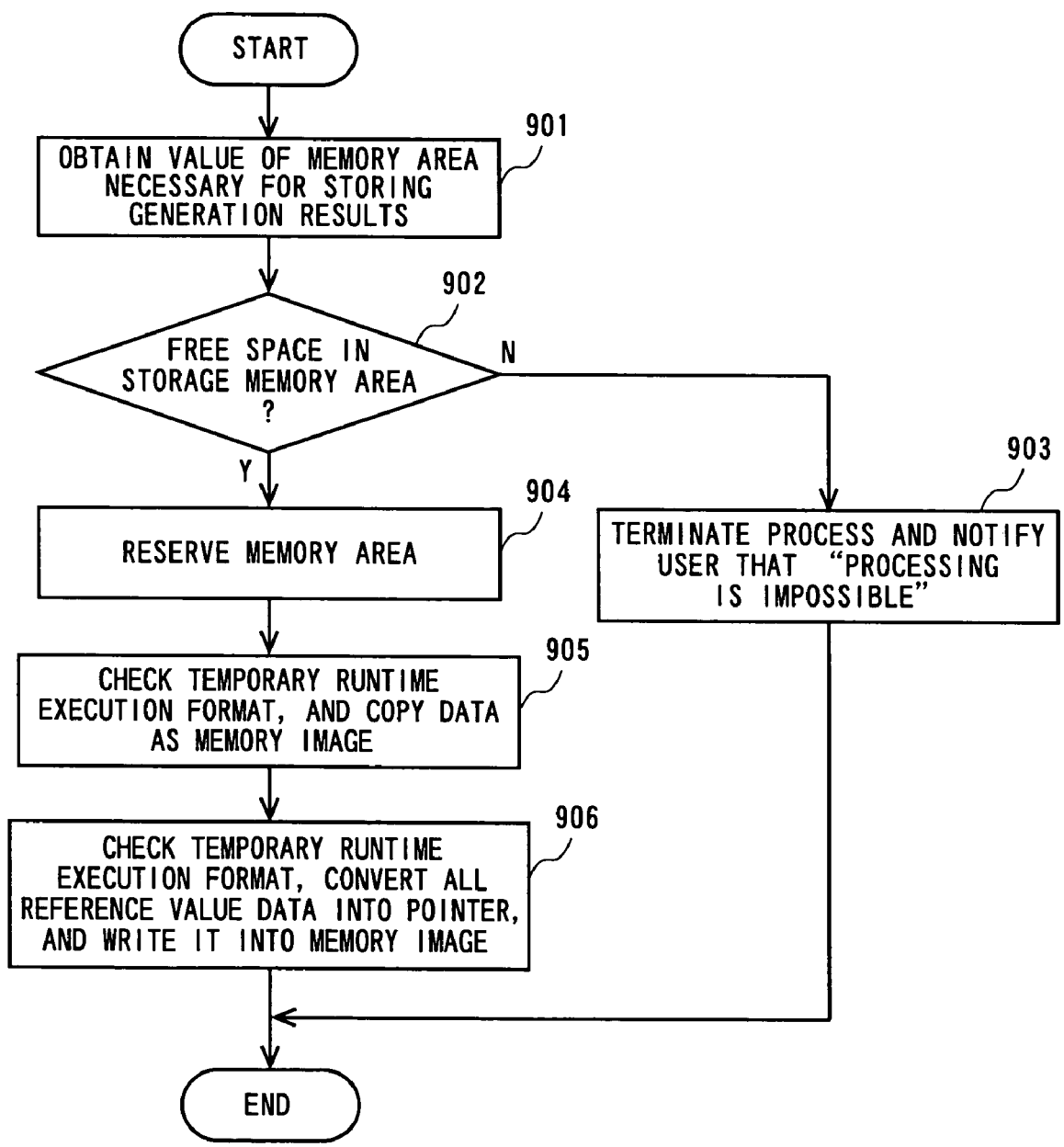
FIG. 12 is a flowchart showing an exemplary operational procedure of a post-loader section according to an embodiment of the present invention.

FIG. 12 shows one example of a flow of a data conversion process in the post-loader section 105.

First, memory usage of the runtime execution format 203 generated by the post-loader section 105 is calculated (step 901). It can be easily obtained by referring to runtime_image_size data of the temporary runtime execution format 202.

Based on the value calculated in step 901, the runtime execution format storing section 303, which is a storage location of the runtime execution format 203, is checked whether or not there is free space in a storage memory area (step 902). If there is no free space (N in step 902), determination is made that continuation of the process by the post-loader section 105 is impossible, the postloading process itself is terminated, and the user is notified that a start-up of the program is impossible, thereby ending the process (step 903). On the other hand, if there is free space (Y in step 902), a memory area corresponding to the value calculated in step 901 is reserved in the runtime execution format storing section 303 (step 904).

Next, the temporary runtime execution format 202 is checked, and data is stored in the runtime execution format storing section 303 by copying data other than a portion represented as a pointer value in the runtime execution format 203 (step 905). It corresponds to data represented as a white box in the memory image of FIGS. 5 and 6.

Finally, data represented as a pointer value in the runtime execution format 203 is calculated, and the calculated data is stored in the runtime execution format storing section 303, thereby ending the conversion from the temporary runtime execution format 202 to the runtime execution format 203 (step 906). This calculation can be realized by converting a reference value in the temporary runtime execution format 202, that is, "an identification number of a class including a structure of a reference destination" and "an entry number in the structure" to a pointer. This data corresponds to data represented as a shaded box in the memory image of FIGS. 5 and 6.

As such, the temporary runtime execution format is previously reserved, whereby it is possible to start-up and execute the program only by the postloading process. As a result, it is possible to substantially reduce an amount of processing for image generation by the following two main effects: (1) memory usage of the generated runtime execution format 203 is easily calculated, and (2) the runtime execution format 203 is easily obtained by almost just copying a memory image other than a pointer value because a memory image of the temporary runtime execution format 202 stores almost the same data of the memory image of the runtime execution format 203, compared to data of the program 201 (class file format), whereby it is possible to reduce a start-up time of a program.

Figure 13:
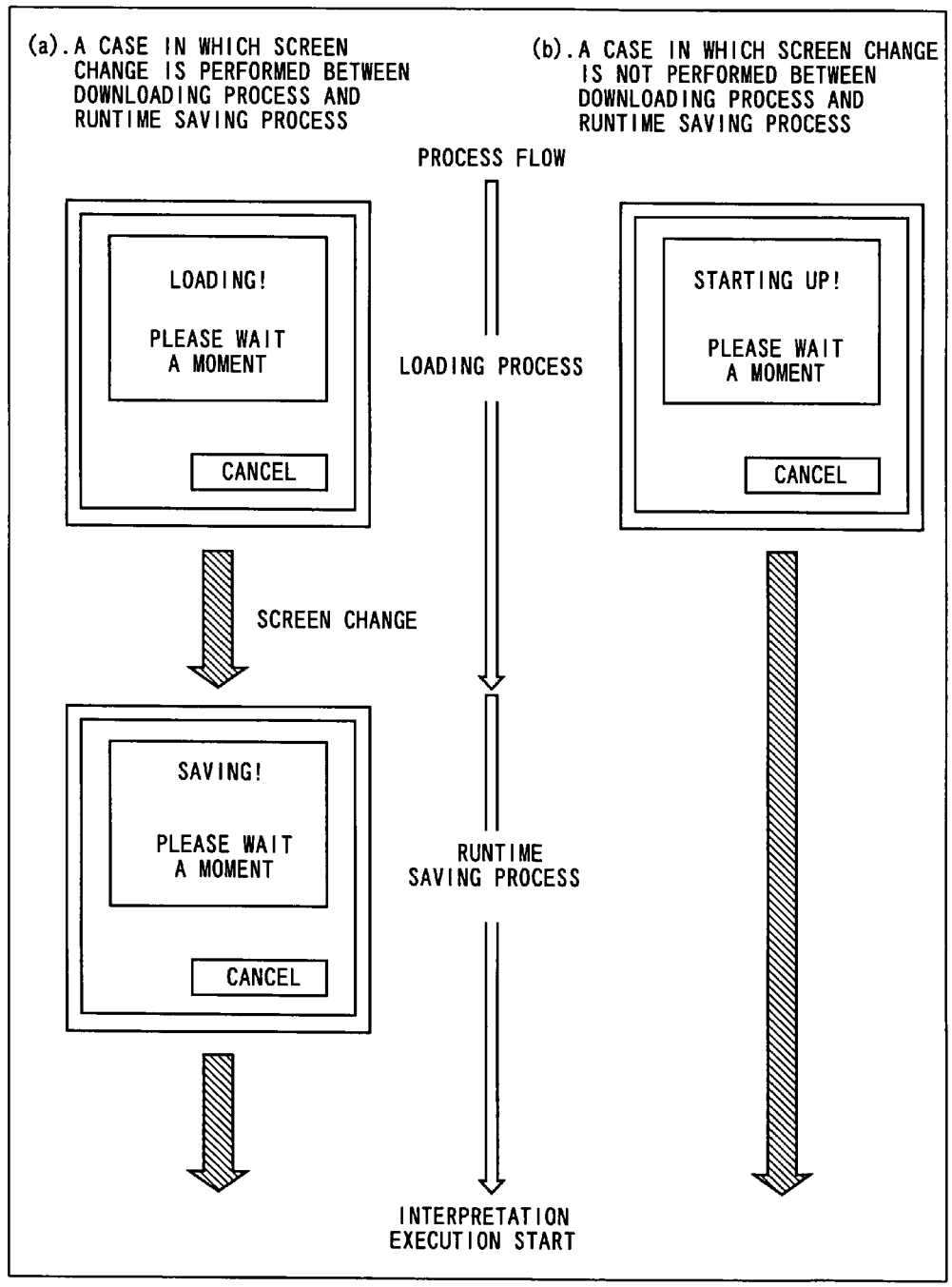
FIG. 13 is an illustration showing an exemplary screen display during a runtime saving process according to an embodiment of the present invention.

FIG. 13 is an illustration showing an exemplary screen display during a runtime saving process.

Note that, in the first embodiment of the present invention, assume that a runtime saving process is performed after the program is loaded. That is, at the time of termination of the loading process by the loader section 102, the runtime saving section 103 may check whether or not there is free space in a memory area in which a temporary runtime execution format is generated and stored, and perform a runtime saving process immediately after determination is made that there is free space.

FIG. 13(a) shows an exemplary case in which a display screen output of the portable information terminal during a process performed by the loader section 102 for converting the program 201 to the runtime execution format 203, and a display screen output of the portable information terminal during a process performed by the runtime saving section 103 for converting the runtime execution format 203 to the temporary runtime execution format 202 are changed for notifying the user of a processing status. In this case, the user may consider a runtime saving process superfluous, and get unnecessarily stressed while he/she is waiting for a program to start execution.

FIG. 13(b) shows an exemplary case in which the same display screen outputs, not the different ones, are used for the above-described two processes, thereby not notifying the user of a break between the above-described processes. As a result, a processing time of the runtime saving process is included in the loading process, whereby it is possible to reduce the unnecessary stress the user may experience.

Figure 14:
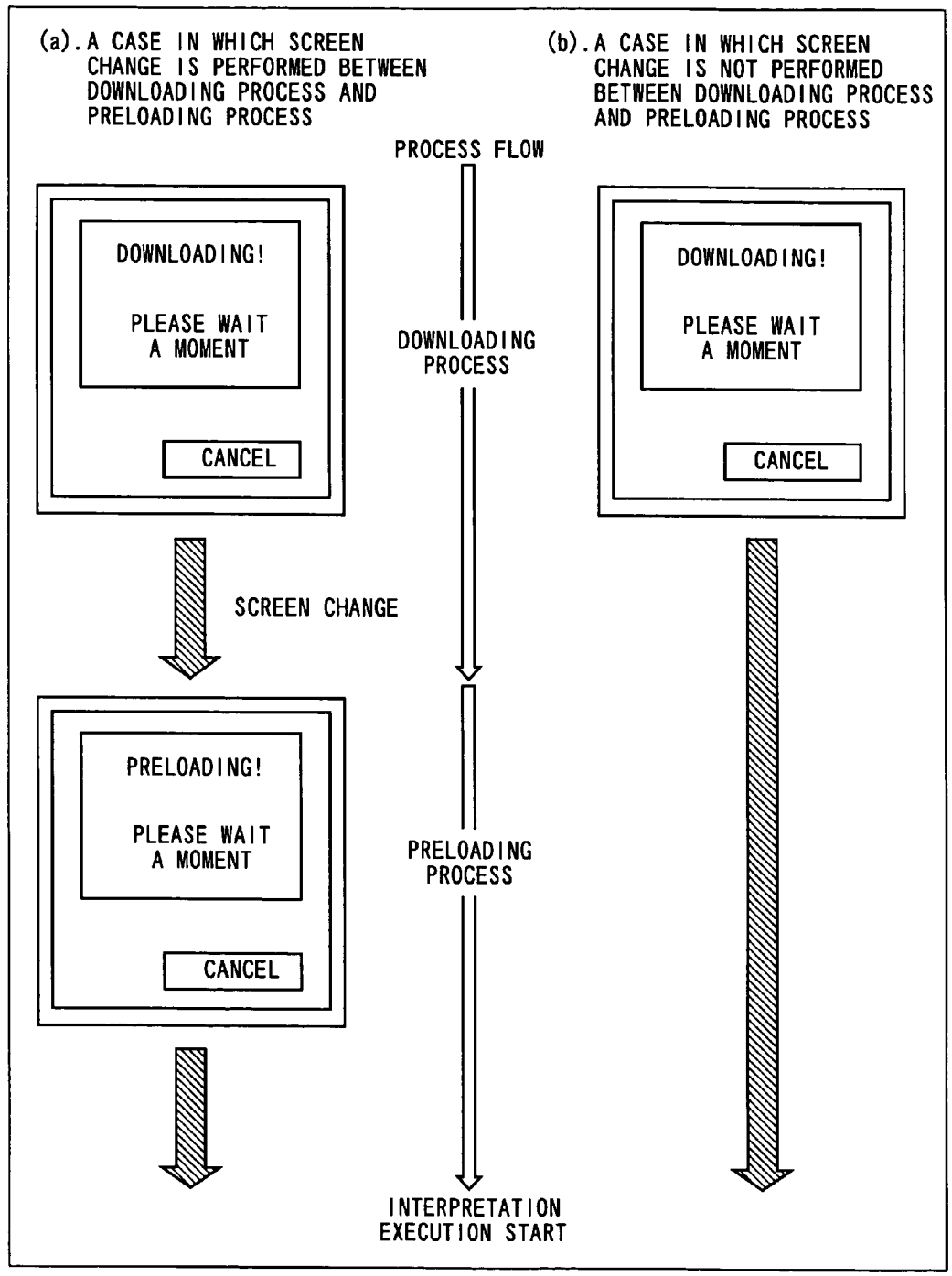
FIG. 14 is an illustration showing an exemplary screen display during a preloading process according to an embodiment of the present invention.

FIG. 14 is an illustration for describing a screen display at the time of a preloading process.

Note that, in the first embodiment of the present invention, assume that the preloading process is unconditionally performed if there is free space in a memory area, in which a temporary runtime execution format is generated and stored, when a program is downloaded. That is, after the downloading process, the preloader section 104 may check whether or not there is free space in a memory area in which a temporary runtime execution format is generated and stored, and perform the preloading process immediately after determination is made that there is free space.

FIG. 14(a) shows an exemplary case in which a display screen output of the portable information terminal during a process performed by the program downloading section 101 for downloading the program 201, and a display screen output of the portable information terminal during a process performed by the preloader section 104 for converting the program 201 to the temporary runtime execution format 202 are changed for notifying the user of a processing status. In this case, the user may consider a preloading process superfluous, and get unnecessarily stressed while he/she is waiting for a program to start execution.

FIG. 14(b) shows an exemplary case in which the same display screen outputs, not the different ones, are used for the above-described two processes, thereby not notifying the user of a break between the above-described processes. As a result, a processing time of the preloading process is included in the downloading process, whereby it is possible to reduce the unnecessary stress the user may experience.

As such, a temporary runtime execution format can be previously reserved by the runtime saving section 103 or the preloader section 104, and therefore interpretation execution of a program can be performed only by a postloading process, whereby it is possible to reduce a start-up time.

Second Embodiment

In the first embodiment of the present embodiment, it is assumed that a runtime saving process by the runtime saving section is performed immediately after a program is loaded. However, it is possible to select/determine a program for which a runtime saving process is to be performed, based on other determination criterion. Hereinafter, details will be described using the drawings.

Figure 15:
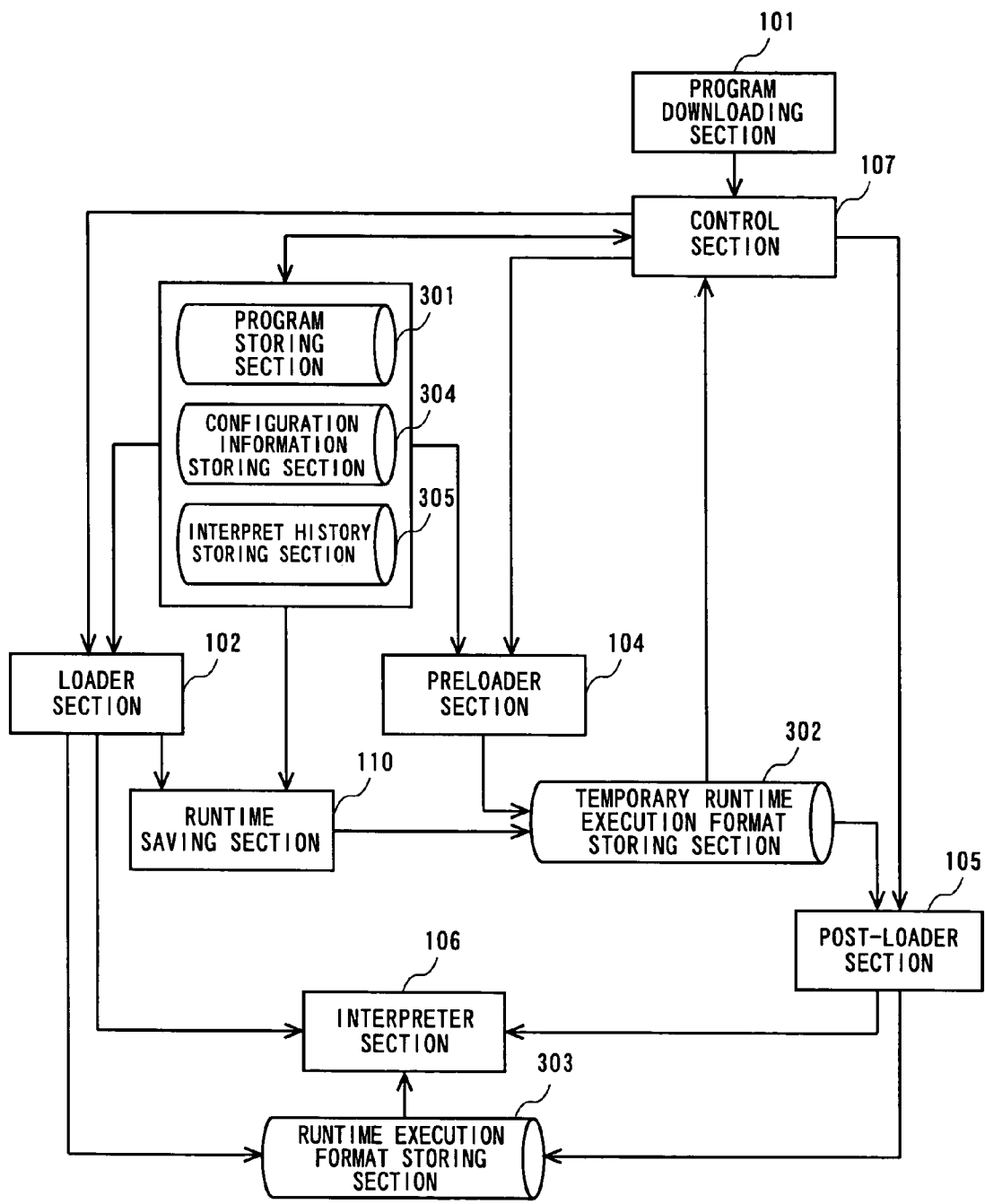
FIG. 15 is a block diagram showing a structure of a program execution processing terminal device according to an embodiment of the present invention.

FIG. 15 is a block diagram showing a structure of a program execution processing terminal device according to a second embodiment of the present invention. It is composed of the program downloading section 101, the loader section 102, the preloader section 104, the post-loader section 105, the interpreter section 106, the control section 107, a runtime saving section 110, the program storing section 301, the temporary run time execution format storing section 302, the runtime execution format storing section 303, a configuration information storing section 304, and an interpret history storing section 305. The program downloading section 101, the loader section 102, the preloader section 104, the post-loader section 105, the interpreter section 106, the control section 107, the program storing section 301, the temporary runtime execution format storing section 302, and the runtime execution format storing section 303 are the same as those described in FIG. 2. Hereinafter, the runtime saving section 110, the configuration information storing section 304, and the interpret history storing section 305, which are newly added, will be described.

The runtime saving section 110 selects/determines a start timing of a runtime saving process and an object program based on the configuration information or the history information stored in the configuration information storing section 304 or the interpret history storing section 305.

The configuration information storing section 304 stores configuration information for identifying a program for which a runtime saving process is to be performed. The configuration information is referred to by the runtime saving section 110 for performing a runtime saving process after a program (quick start-up program) specified as an object of a runtime saving process is loaded.

Figures 16, 17:
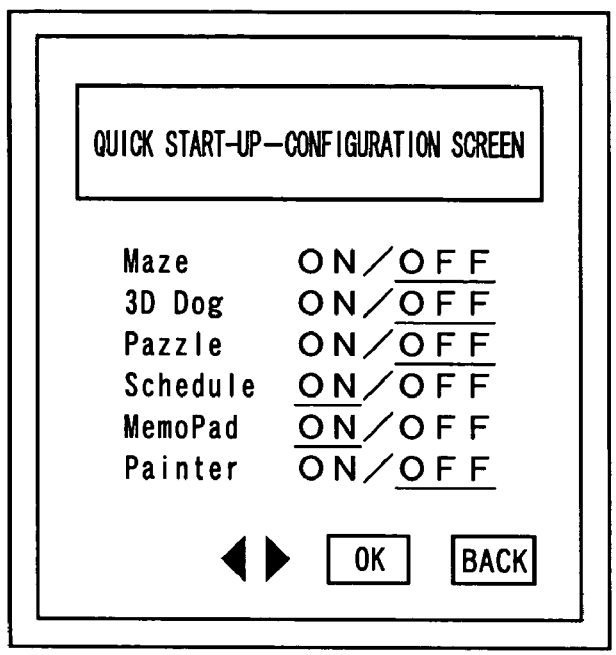
FIG. 16 is an illustration showing one example of a configuration information input screen according to an embodiment of the present invention.
FIG. 17 is an illustration showing exemplary interpret history information according to an embodiment of the present invention.

The configuration information stored in the configuration information storing section 304 is determined, for example, based on a designation input by the user. FIG. 16 is an illustration showing one example of an input screen. The user can designate ON or OFF of a quick start-up for each program on a program list displayed on the display screen of the portable information terminal. In FIG. 16, "Schedule" and "Memo-Pad" are designated as a quick start-up ON program. When the quick start-up ON program is loaded, a runtime saving process is performed, and a runtime saving process is not performed when other program is loaded. Note that it is possible to always designate a specific program as a quick start-up one irrespective of the designation input by the user.

The interpret history storing section 305 stores history information about previously performed interpretation execution of each program. The history information is referred to by the runtime saving section 110 for performing a runtime saving process after a program, which is determined to be a frequently used one based on the history information, is loaded.

One example of the history information stored in the interpret history information storing section 305 is shown in FIG. 17. In FIG. 17, information about how many times each of the programs, which are stored in the program storing section 301, has been started-up so far, and information about when it was started-up last is reserved as a table. Note that other information such as an average running time and a start-up interval may be included, or only a piece of information such as the number of start-up times may be enough. When a certain program is loaded, the following determination criteria, for example, may be applied to determine whether to perform a runtime saving process for the program. Note that other determination criterion based on the history information of the interpret history storing section 305 may be used.

By a first determination criterion, if a program which has been started-up three or more times is loaded, the program is determined as a frequently used one, and a runtime saving process is performed. A value of a selection criterion is not limited to three, but it may be an arbitrary value.

By a second determination criterion, the first and second most frequently started-up programs among all programs are determined as frequently used ones, and a runtime saving process is performed. With regard to a value of a selection criterion, it is not limited to the first and the second, but it may be an arbitrary value.

As such, a program for which a runtime saving process is to be performed can be selected, whereby it is possible to perform a runtime saving process by selecting a program requiring a quick start-up or a frequently used program. Thus, it is possible to prevent a temporary runtime execution format of a program requiring no quick start-up or a less frequently used program from occupying a storage area of the temporary runtime execution format storing section 302. That is, it is possible to prevent a failure of a runtime saving process of a program requiring a quick start-up or a frequently used program due to an insufficient free storage space in the temporary runtime execution format storing section 302, whereby it is possible to perform an efficient runtime saving process.

Third Embodiment

In the first embodiment, it is assumed that a preloading process by the preloader section is performed for a program downloaded after other program was downloaded. However, it is possible to select/determine a start timing of a preloading process and an object program based on other determination criterion.

Figure 18:
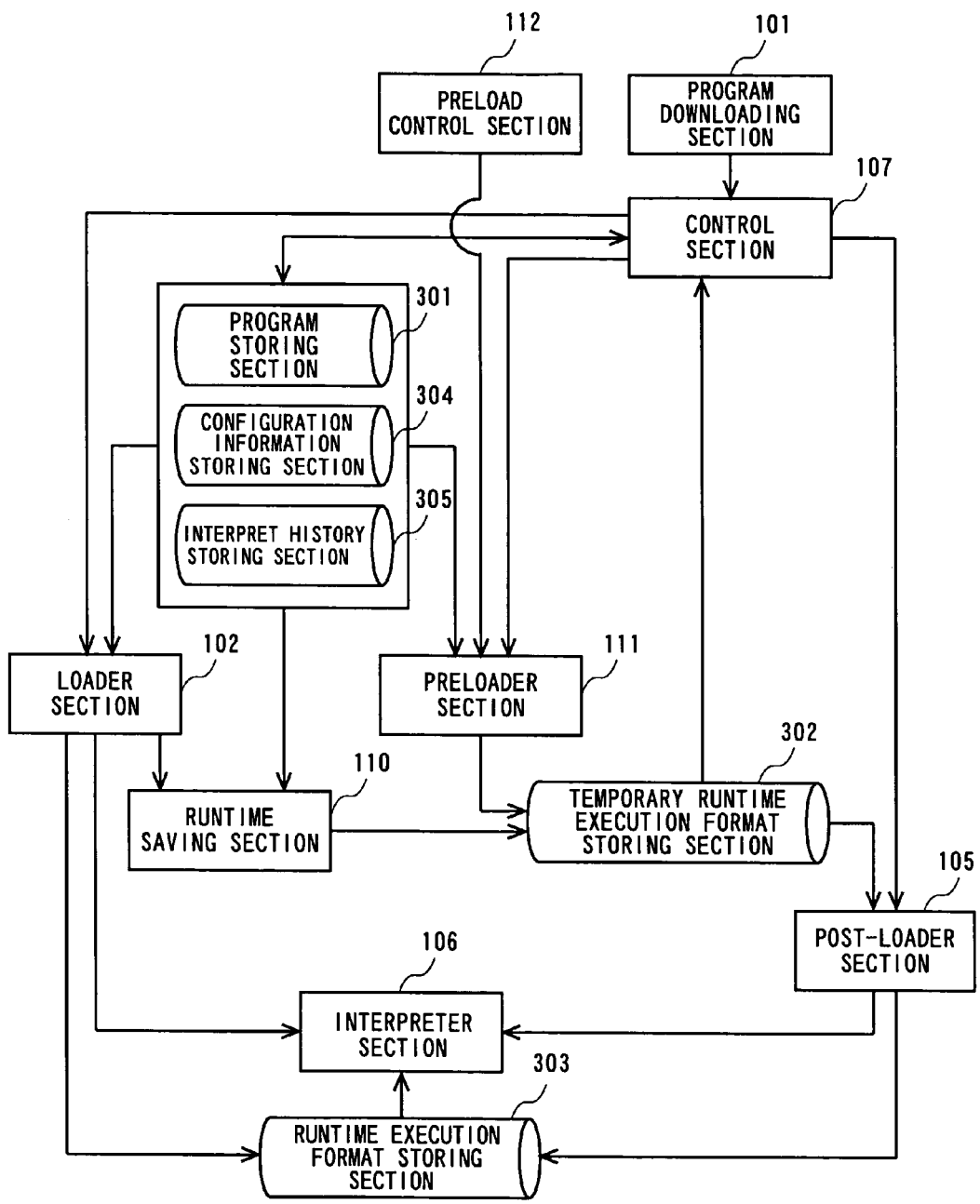
FIG. 18 is a block diagram showing a structure of a program execution processing terminal device according to an embodiment of the present invention.

FIG. 18 is a block diagram showing a structure of a program execution processing terminal device according to a third embodiment of the present invention. It is composed of the program downloading section 101, the loader section 102, the post-loader section 105, the interpreter section 106, the control section 107, the runtime saving section 110, a preloader section 111, a preload control section 112, the program storing section 301, the temporary runtime execution format storing section 302, the runtime execution format storing section 303, the configuration information storing section 304, and the interpret history storing section 305. The program downloading section 101, the loader section 102, the post-loader section 105, the interpreter section 106, the control section 107, the program storing section 301, the temporary runtime execution format storing section 302, the runtime execution format storing section 303, the configuration information storing section 304, and the interpret history storing section 305 are the same as those described in FIG. 15. Hereinafter, the preloader section 111 and the preload control section 112, which are newly added, will be described.

The preloader section 111 receives a notification from the preload control section 112, thereby performing a preloading process for converting a program stored in the program storing section 301 to a temporary runtime execution format, and storing it in the temporary runtime execution format storing section 302. Especially, in the case where an identifier designating a specific program is notified, a notified program is selected as an object of a preloading process. Note that it is possible to perform a preloading process after a program is downloaded, by receiving a preloading process start instruction from the control section 107. Also, a program for which a preloading process is to be performed is selected/determined based on the configuration information or the history information stored in the configuration information storing section 304 or the interpret history storing section 305.

The preload control section 112 determines a preload start timing based on a device status of the portable information terminal, and notifies the preloader section 111 of a start of a process. Note that a program for which preloading is to be performed may be determined by the preload control section 112, thereby notifying the preloader section 111 of the determined program, or only a start timing may be notified without designating a program for which preloading is to be performed, and the preloader section 111 may select a program to be processed. Also, as a device status, for example, the following determination criteria may be applied.

By a first determination criterion, a preloading process is performed in the case where the portable information terminal is in a (standby) state in which no user input operation is accepted. In this case, the preload control section 112 has previously-set time length data (reference time period), measures a continuous time period of a (standby) state in which no user input operation is performed, and performs a comparison with the reference time period, thereby determining a start timing.

Figure 19:
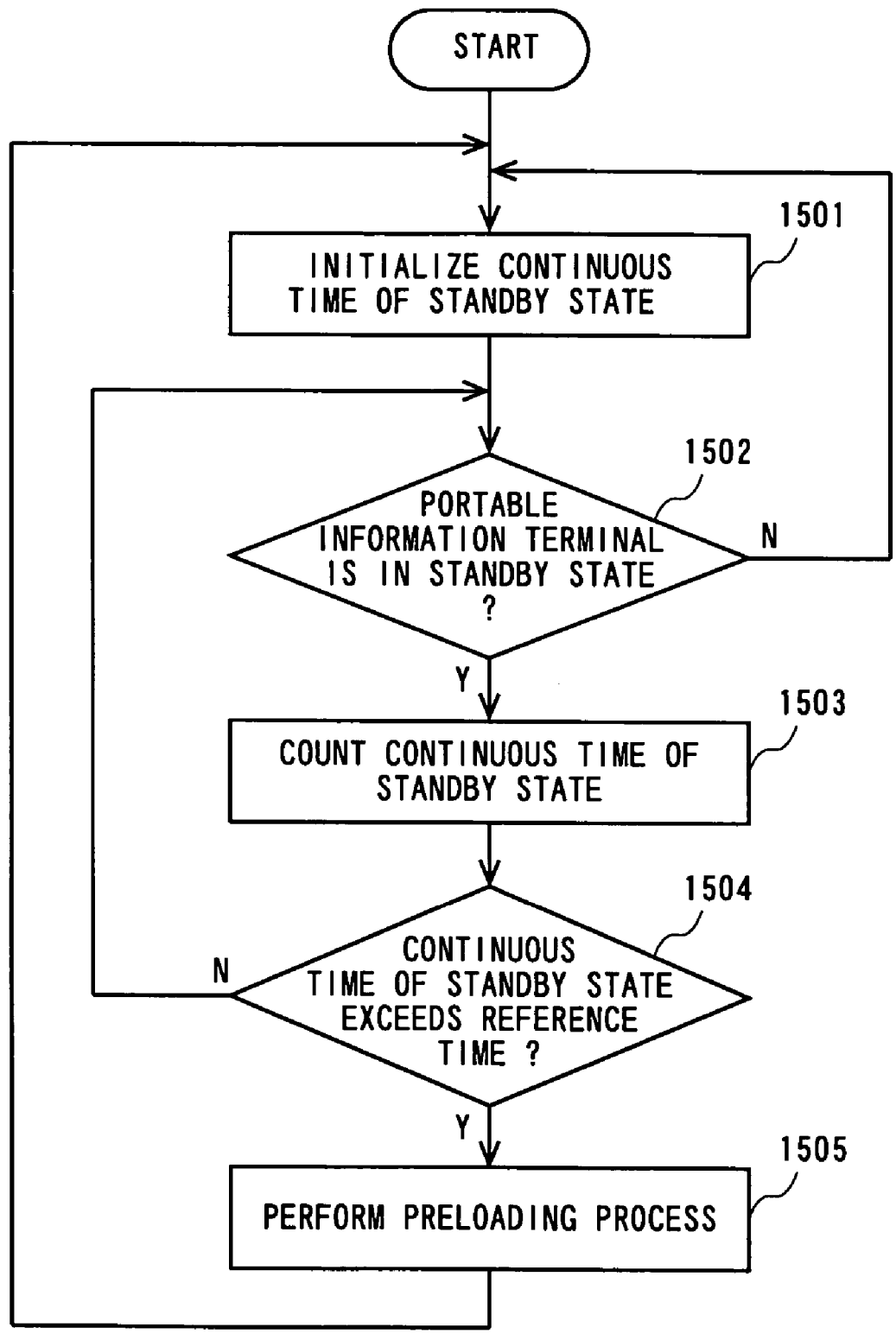
FIG. 19 is a flowchart showing an exemplary operational procedure of a preload control section according to an embodiment of the present invention.

FIG. 19 is a flowchart showing one example of a flow of a process in the preload control section 112.

First, a continuous time period of a standby state is initialized (step 1501).

It is detected whether or not a device status of the portable information terminal is in a (standby) state in which no user input is accepted for more than a predetermined time (step 1502). If it is not in a standby state (N in step 1502), the process is repeated after going back to step 1501. On the other hand, if it is in a standby state (Y in step 1502), a continuous time period of the standby state is updated (step 1503), and a length of the continuous time period is compared with the reference time period (step 1504).

Until a continuous time period of the standby state exceeds the reference time period (N in step 1504), step 1502 to step S1504 are repeated. When a continuous time period of the standby state exceeds the reference time period (Y in step 1504), it is determined that it is a start timing of a preloading process, and start of a process is notified to the preloader section 111.

Figure 20:
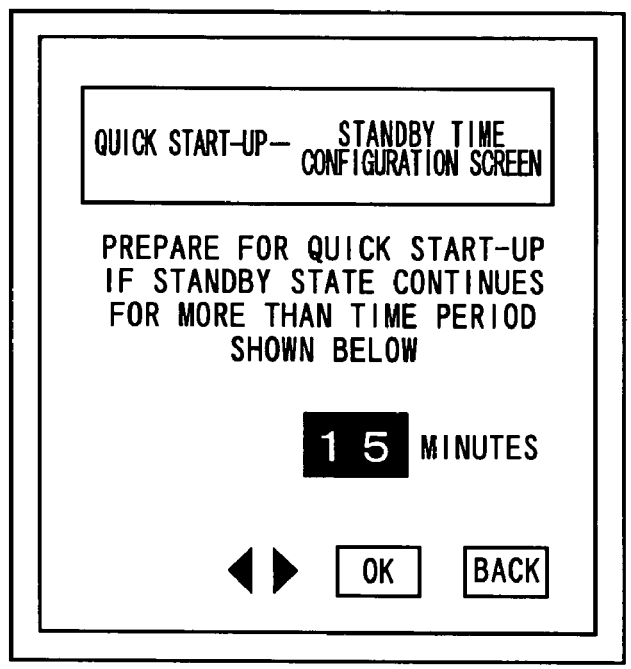
FIG. 20 is an illustration showing one example of a reference time period input screen according to an embodiment of the present invention.

Note that a reference time period may be a unique value of the portable information terminal, for example, in the form of ROM, or the value may be able to be changed by a user input. FIG. 20 shows one example of a display screen at the time of setting by the user. Here, fifteen minutes are set as a reference time period, and a preloading process is started at a time when a continuous time period of a standby state exceeds fifteen minutes.

By the first determination criterion, a preloading processing is executed while the user does not operate the portable information terminal, the preloading process is hidden from the eye of the user. Thus, the user does not feel stress by the execution of the preloading process, which is an advantage.

By a second determination criterion, a preloading process is performed when the portable information terminal recovers from a standby state. In this case, the preload control section 112 detects that the portable information terminal enters a non-standby state from a standby state by the user's input operation, that is, a standby state is ended, thereby determining a start timing.

By a third determination criterion, a preloading process is performed when an internal time of the portable information terminal reaches a predetermined one. In this case, the preload control section 112 has previously-set time data (reference time), thereby determining a start timing by comparing an actual current time with the reference time, and detecting correspondence therebetween.

Figure 21:
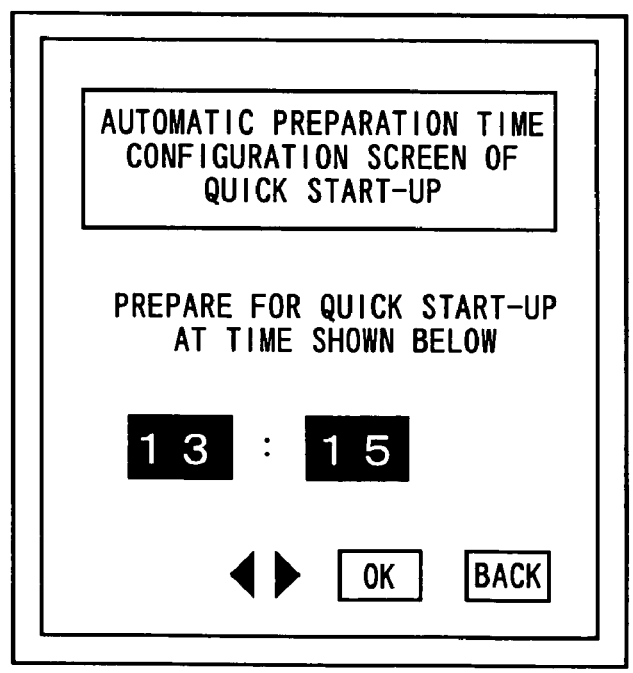
FIG. 21 is an illustration showing one example of a reference time input screen according to an embodiment of the present invention.

Note that the reference time may be a unique value of the portable information terminal, for example, in the form of ROM, or the value may be able to be changed by a user's input. FIG. 21 shows one example of a display screen at the time of setting by the user. Here, 13:15 is set as a reference time, and a preloading process is started at a time when an actual current time reaches 13:15.

By a fourth determination criterion, a preloading process is performed when power is applied to the portable information terminal. In this case, the preload control section 112 determines a start timing when power is applied. A mechanism itself for detecting power-on of the portable information terminal can be realized using, for example, a mechanism used in a conventional portable information terminal for notifying an event from a device.

By a fifth determination criterion, in the case where the portable information terminal is a flip style terminal (e.g., flip mobile phone), a preloading process is performed when the user opens/closes the flip style portable information terminal. In this case, the preload control section 112 determines a start timing by detecting that the portable information terminal changes from a closed state to an open state, or the portable information terminal changed from an open state to a closed state. A mechanism itself for detecting opening/closing of the flip portable information terminal can be realized using, for example, a mechanism used in a conventional portable information terminal for notifying an event from a device.

By a sixth determination criterion, a preloading process is performed when communication is started between the portable information terminal and other electronic device. In this case, the preload control section 112 determines a start timing by detecting a start of data communication between the portable information terminal and other electronic device. A mechanism itself for detecting a start of communication can be realized using, for example, a mechanism used in a conventional portable information terminal for notifying an event from a device.

Specifically, the above-described communication may be call-in of a voice call, data communication using HTTP, data communication using FTP, data communication using SSL, and IrDA-compliant data communication, for example. Needless to add, it may be other types of communication supported by the portable information terminal. Also, a program for which a preloading process is to be performed based on a start of communication may be selected in accordance with a type of the started communication. The above-described program selection will be described below (FIG. 23).

By a seventh determination criterion, a preloading process is performed in the case where connection/disconnection is performed between the portable information terminal and other electronic device. In this case, the preload control section 112 determines a start timing by detecting that other electronic device is attached to (mounted on) the portable information terminal, or other electronic device attached to (mounted on) the portable information terminal is removed therefrom. A mechanism itself for detecting connection/disconnection of an external device can be realized using, for example, a mechanism used in a conventional portable information terminal for notifying an event from a device.

Specifically, the above-described external device may be an external storage device such as an SD card, a feature expansion unit such as Bluetooth, a USB connector, an earphone, a microphone, a power connector, a battery charger, and a keyboard, for example. Needless to add, it may be other types of external devices supported by the portable information terminal. Also, a program for which a preloading process is to be performed based on connection/disconnection of an external device may be selected in accordance with a type of the external device. The above-described program selection will be described below (FIG. 23).

By an eighth determination criterion, a preloading process is performed at the time of a staff or end of execution of another application installed in the portable information terminal. In this case, the preload control section 112 determines a start timing by detecting that execution of another application installed in the portable information terminal is staffed, or execution of another application is ended. A mechanism itself for detecting a start/end of execution of another application can be realized using an inter-software communication mechanism used in a conventional portable information terminal.

Specifically, the above-described other application may be any application installed in the portable information terminal, such as a browser, a mailer, a scheduler, and a media player. Also, the above-described other application may be described in a machine language (native), or may be described with a mechanism using other execution system such as Java (™). Also, a program for which a preloading process is to be performed in conjunction with a start or end of other application may be selected in accordance with a type of other application such that the program may be started-up in cooperation with the application whose execution was started. The above-described program selection will be described below (FIG. 23).

By a ninth determination criterion, a preloading process is performed when a predetermined screen change is performed in accordance with an input operation by the user of the portable information terminal. In this case, the preload control section 112 determines a start timing by detecting that a change of an internal state of the portable information terminal is performed based on the user input operation. Note that a combination of instructions input-operatable by the user is set for each internal state, whereby a next processing operation performed after a specific input operation is determined. That is, the internal state sequentially changes in accordance with, for example, an input operation by the user and a status of communication with the outside, and a display screen often changes in accordance with a change of the internal state. When a previously-set specific change, which is included in the internal state changes, is performed, the preload control section 112 detects it. Internal state change detection itself can be realized using an inter-software communication mechanism used in a conventional portable information terminal.

Figure 22:
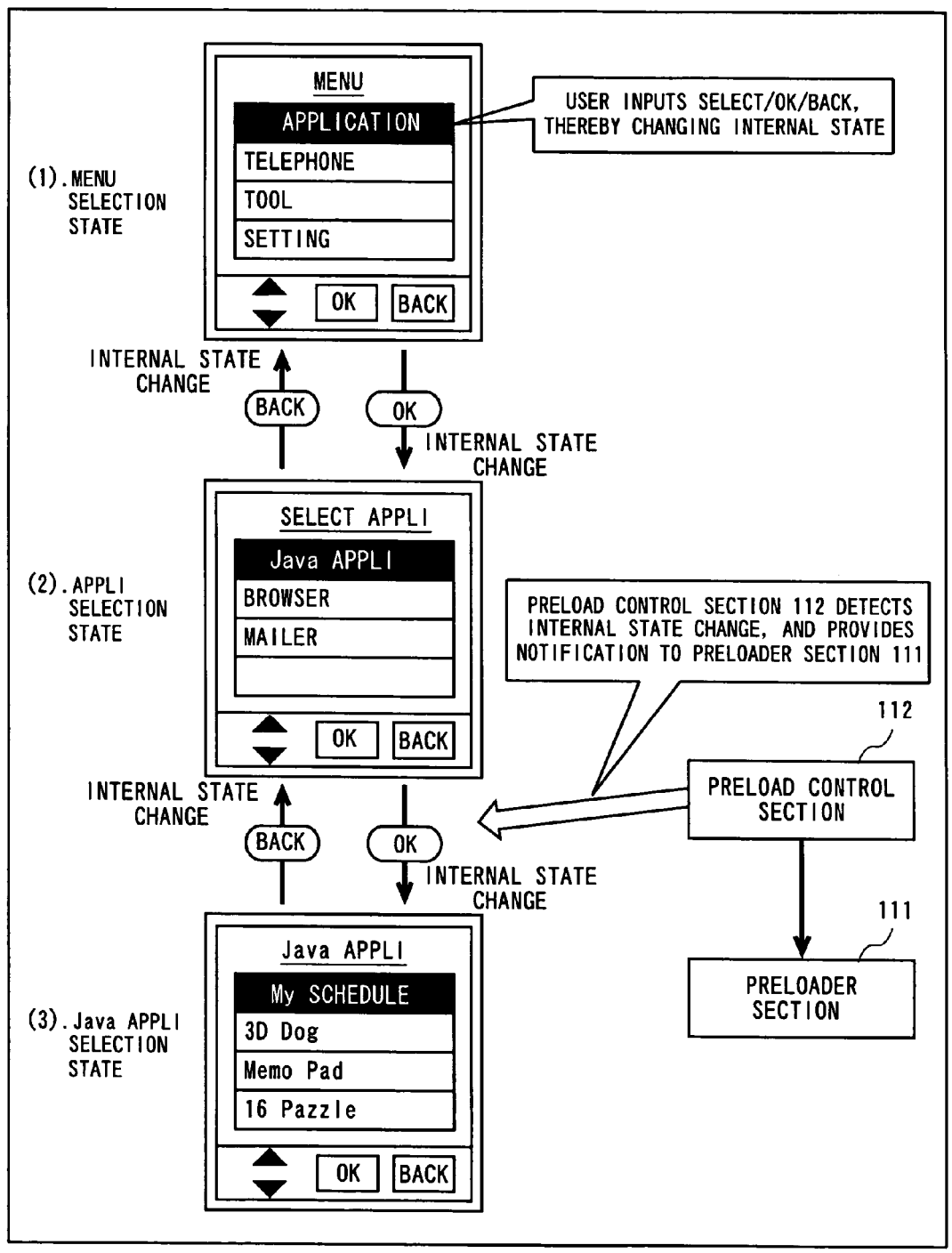
FIG. 22 is an illustration showing an exemplary internal state change according to an embodiment of the present invention.

FIG. 22 shows one example of an internal state change. In this example, three internal states: "(1) menu selection state", "(2) appli selection state", and "(3) Java appli selection state" are shown. When a specific internal state change occurs (a change from FIG. 22 (2) to (3)), the preload control section 112 detect it, and notifies the preloader section 111 of a start of a process. In response to the notification, the preloader section 111 starts a preloading process for the program. Also, a program for which a preloading process is to be performed in conjunction with an internal state change may be selected in accordance with a type of an internal state change. The above-described program selection will be described below (FIG. 23).

As such, a start timing of a preloading process can be determined based on each determination criterion, thereby performing an efficient preloading process also in a case other than downloading.

Next, it will be described how to select a program to be =processed.

There are two main selection criteria: (A) a case in which the preloader section 111 selects a program, and (B) a case in which a program to be processed is notified from the preload control section 112. The following selection criteria, for example, may be applied to the case (A).

By a fist criterion, selection is performed appropriately (randomly) from among the programs downloaded to the portable information terminal. In this case, the preloader section 111 may perform a preloading process by selecting an appropriate one from among the programs stored in the program storing section 301.

By a second selection criterion, a preloading process is performed by selecting a program set as a quick start-up program from among the programs downloaded to the portable information terminal based on the configuration information stored in the configuration information storing section 304. A preloading process is not performed for other programs. Note that the configuration information storing section 304 has been described in the second embodiment.

By a third selection criterion, a preloading process is performed by selecting a program determined as a frequently used one based on the history information stored in the interpret history storing section 305. For example, a program with the greatest number of start-up times is selected, or a most recently started-up program is selected. Note that the interpret history storing section 305 has been described in the second embodiment.

In the case (B), a preload control section 112 selects a program to be processed in accordance with a condition for starting a preloading process. In this case, the preload control section 112 has a preloading process correspondence table, and selects/determines a program to be processed based on the correspondence table.

FIG. 23 shows one example of a preloading process correspondence table. Here, a unique ID number, i.e., a condition number, is provided to each condition for starting a preloading process, thereby identifying each condition. Also, in FIG. 23, start conditions are described as text, but it is sufficient if each meaning corresponds to each condition number without using the same number twice. Further, an identifier of a program for which a preloading process is to be performed is represented as a letter string, but other representation may be used. By previously storing a program which is highly related to each preloading process start condition, that is, which is likely to be performed next, in the preloading process correspondence table, it is easily obtain an effect of speeding up of a start-up by a preloading process. For example, in the case where the present invention is applied to a mobile phone which can send and receive e-mail, when the mobile phone receives e-mail, it is anticipated that the user may notice that e-mail is received, and try to view the e-mail, and therefore it is useful to set so that a mailer program is preloaded when the mobile phone receives e-mail. As a result, a start-up time needed by the user for starting up the mailer is reduced.

As such, a start timing of a preloading process and an object program can be selected, whereby it is possible to perform an effective preloading process by selecting a program requiring a quick start-up and a frequently used program.

Fourth Embodiment

Figure 24:
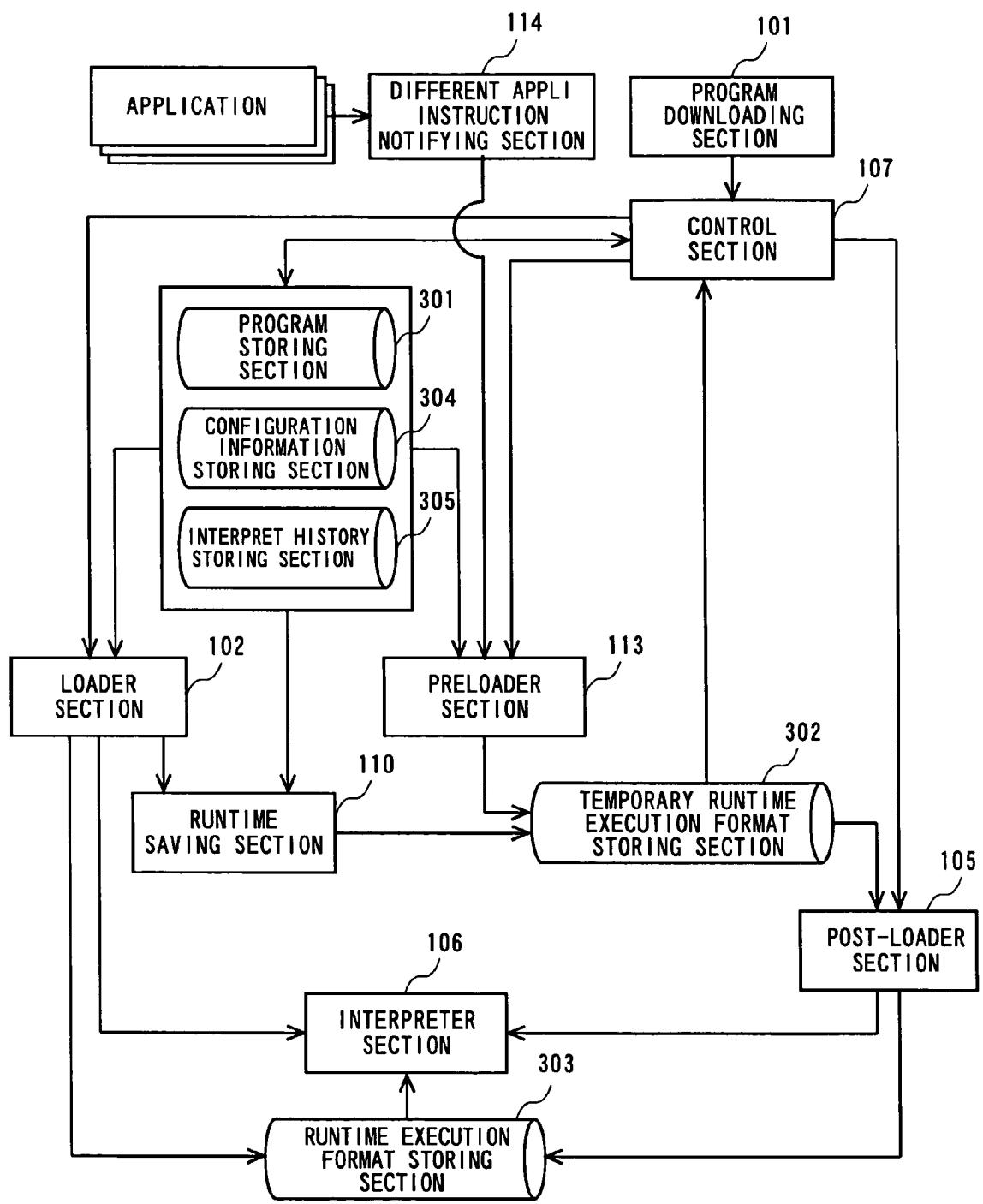
FIG. 24 is a block diagram showing a structure of a program execution processing terminal device according to an embodiment of the present invention.

FIG. 24 is a block diagram showing a structure of a program execution processing terminal device according to a fourth embodiment of the present invention. It is composed of the program downloading section 101, the loader section 102, the runtime saving section 110, the post-loader section 105, the interpreter section 106, the control section 107, a preloader section 113, a different appli instruction notifying section 114, the program storing section 301, the temporary runtime execution format storing section 302, the runtime execution format storing section 303, the configuration information storing section 304, and the interpret history storing section 305. The program downloading section 101, the loader section 102, the runtime saving section 110, the post-loader section 105, the interpreter section 106, the control section 107, the program storing section 301, the temporary runtime execution format storing section 302, the runtime execution format storing section 303, the configuration information storing section 304, and the interpret history storing section 305 are the same as those described in FIG. 15. Hereinafter, the preloader section 113 and the different appli instruction notifying section 114, which are newly added, will be described.

The preloader section 113 receives a notification from the different appli instruction notifying section 114, thereby performing a preloading process such that a program stored in the program storing section 301 is converted to a temporary runtime execution format, and is stored in the temporary runtime execution format storing section 302. Especially, in the case where an identifier for designating a specific program is notified, the notified program is selected as an object of a preloading process. Note that it is possible to perform a preloading process immediately after a program is downloaded by receiving a preload start instruction from the control section 107.

The different appli instruction notifying section 114 notifies the preloader section 113 that a preload start instruction is issued from a different application installed in the portable information terminal.

Figure 25:
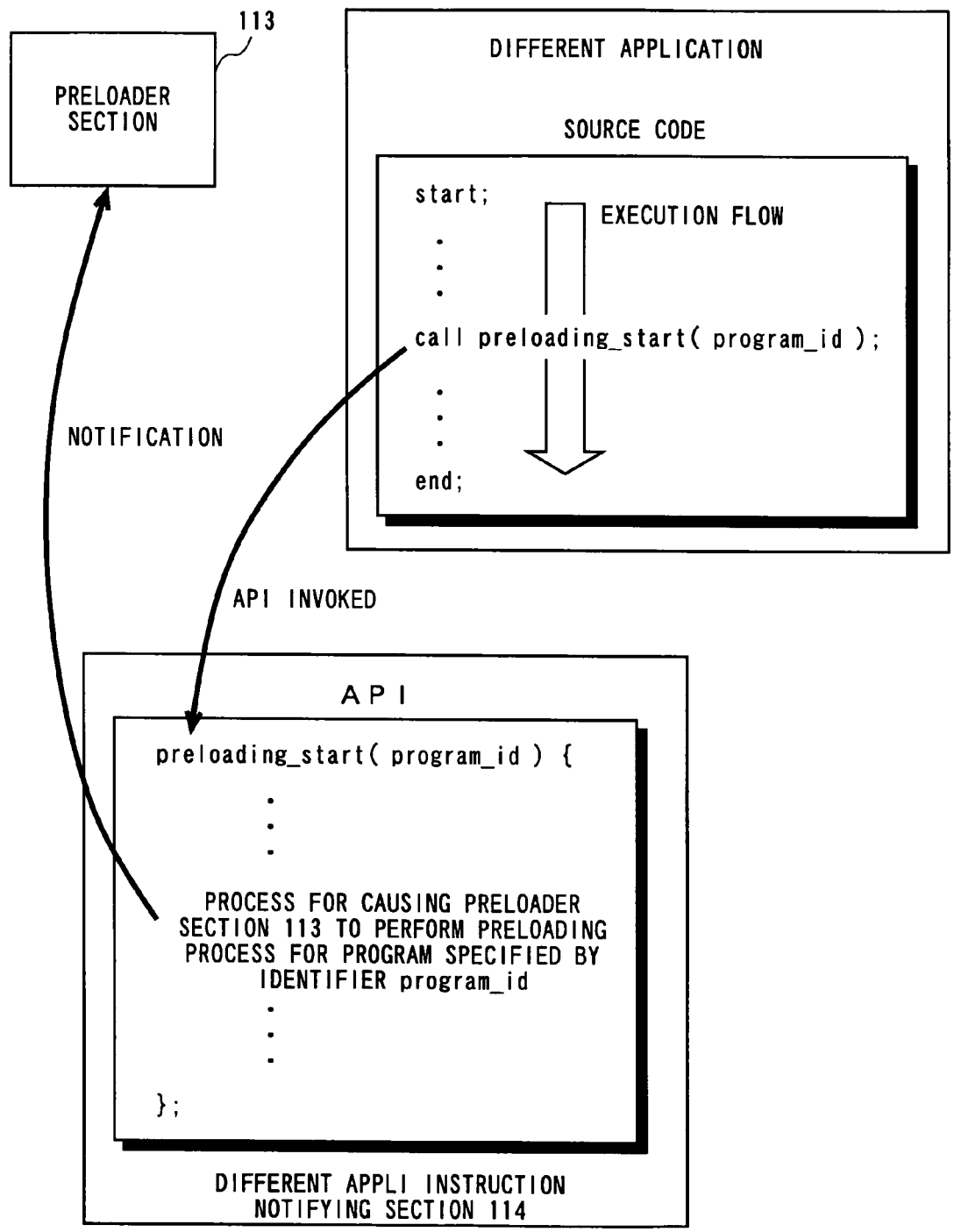
FIG. 25 is an illustration showing one example of an outline of a process of a different appli instruction notifying section according to an embodiment of the present invention.

FIG. 25 shows one example of an outline of an operation in the case where a preload start is instructed by the different application.

A mechanism itself for receiving a preload start instruction from a different application can be realized, for example, by providing an API, which can be invoked from a source code of the different application, for the portable information terminal. When the API is invoked, the different appli instruction notifying section 114 performs a process for instructing the preloader section 113 to start a preloading process. In FIG. 25, an exemplary operation in which an API represented as preloading_start is invoked from the different application for notifying the preloader section 113 of a preloading process start is shown.

Also, a program for which a preloading process is to be performed can be specified in conjunction with the API when it is invoked. In FIG. 25, an example in which a program is specified as an argument of the API is shown. Assume that an argument program_id represents an identifier of a program stored in the program storing section 301, and a notification performed to the preloader section 113 during a process of preloading_start includes information about program_id. The preloader section 113 receives information about program_id, and selects a program for which a preloading process is to be performed. Note that it is possible to select/execute a program for which a preloading process is to be performed next by the preloader section 113 without designating a program.

As such, rather than determining a trigger of a preloading process start based on a device status, it can be freely specified in the application being executed. That is, by generating an application to invoke a preloading process of a specific program, the portable information terminal executing the application is caused to perform a preloading process for the specific program such as a program scheduled to be executed next, whereby it is possible to reduce a start-up time of the specific program.

INDUSTRIAL APPLICABILITY

Based on the present invention, when a Java (™) program, for example, downloaded to the portable information terminal using the program distribution service is started-up, it is possible to reduce a start-up time of the program by performing a preloading process and a runtime saving process.

The invention claimed is:

1. A program execution processing terminal device for performing interpretation execution for a received program, comprising:
- a program storing section for storing the received program;
- a loader section for converting the received program stored in the program storing section to a runtime execution format;
- a runtime execution format storing section for storing the runtime execution format generated by the loader section;
- a runtime saving section for converting the runtime execution format stored in the runtime execution format storing section to a temporary runtime execution format;
- a temporary runtime execution format storing section for storing the temporary runtime execution format generated by the runtime saving section;
- a post-loader section for converting the temporary runtime execution format stored in the temporary runtime execution format storing section to a runtime execution format and thus storing the runtime execution format into the runtime execution format storing section;
- an interpreter section for performing interpretation execution for the runtime execution format stored in the runtime execution format storing section; and
- a control section for, when a start-up of the received program stored in the program storing section is instructed, determining whether or not there is a temporary runtime execution format corresponding to the received program in the temporary runtime execution format storing section causing the loader section to generate a runtime execution format from the received program if there is none, and causing the post-loader section to generate a runtime execution format from the temporary runtime execution format if there is any, wherein
- the temporary runtime execution format generated by the runtime saving section includes data related to the amount of the runtime execution format based on which the temporary runtime execution format is generated and which is stored in the runtime execution format storing section, and
- the post-loader section controls, based on the data related to the amount included in the temporary runtime execution format stored in the temporary runtime execution format storing section, whether or not the runtime execution format generated from the temporary runtime execution format is to be stored into the runtime execution format storing section.

2. The program execution processing terminal device according to claim 1, further comprising:
- a preloader section for performing a preloading process for converting the received program stored in the program storing section to a temporary runtime execution format, wherein
- the temporary runtime execution format storing section stores the temporary runtime execution format converted by the preloader section.

3. The program execution processing terminal device according to claim 1, wherein
- the runtime execution format includes a pointer indicating a storage address of predetermined data included in the runtime execution format in the runtime execution format storing section, and
- the temporary runtime execution format includes reference value data, which is information corresponding to the pointer indicated by indirect reference representation.

4. The program execution processing terminal device according to claim 1, wherein the temporary runtime execution format includes data indicating a size of a runtime execution format converted from the temporary runtime execution format.

5. The program execution processing terminal device according to claim 1, further comprising:
- a preloader section for converting the received program stored in the program storing section to a temporary runtime execution format, wherein
- the temporary runtime execution format storing section stores the temporary runtime execution format converted by the runtime saving section and the preloader section.

6. The program execution processing terminal device according to claim 1, wherein
- the received program has a class file including a reference value;
- the loader section converts, when converting the received program stored in the program storing section to the runtime execution format, the reference value included in the class file of the loader section to data represented as a pointer value;
- the runtime saving section converts, when converting the runtime execution format generated by the loader section to the temporary runtime format, the pointer value included in the runtime execution format to a class identification number and an entry number which correspond to the pointer value; and
- the post-loader section converts, when converting the temporary runtime execution format stored in the temporary runtime execution format storing section to the runtime execution format, the class identification number and the entry number which are included in the temporary runtime execution format to a pointer value.

7. The program execution processing terminal device according to claim 1, further comprising:
- a configuration information storing section for storing quick staff-up configuration information corresponding to the received program stored in the program storing section, wherein
- the runtime saving section selects/determines a program to be converted to a temporary runtime execution format based on the quick staff-up configuration information stored in the configuration information storing section.

8. The program execution processing terminal device according to claim 1 further comprising:
- an interpret history storing section for storing history information about interpretation execution of the received program stored in the program storing section, wherein
- the runtime saving section selects/determines a program to be converted to a temporary runtime execution format based on the history information stored in the interpret history storing section.

9. The program execution processing terminal device according to claim 2, wherein a process for receiving a program is followed by a process by the preloader section for converting the received program to a temporary runtime execution format to generate a temporary runtime execution format.

10. The program execution processing terminal device according to claim 9, wherein a same display screen output is performed during a process for receiving a program, and during a process by the preloader section for converting the received program to a temporary runtime execution format to generate a temporary runtime execution format.

11. The program execution processing terminal device according to claim 2, further comprising:
a configuration information storing section for storing quick staff-up configuration information corresponding to the received program stored in the program storing section, wherein
the preloader section selects/determines a program to be converted to a temporary runtime execution format based on the quick staff-up configuration information stored in the configuration information storing section.

12. The program execution processing terminal device according to claim 2, further comprising:
an interpret history storing section for storing history information about interpretation execution of the received program stored in the program storing section, wherein
the preloader section selects/determines a program to be converted to a temporary runtime execution format based on the history information stored in the interpret history storing section.

13. The program execution processing terminal device according to claim 2, further comprising:
a preload control section for determining a staff timing at which conversion to a temporary runtime execution format is performed based on a device status of the program execution processing terminal device, and requesting the preloader section to start a process, wherein
when a start is requested by the preload control section, the preloader section performs a process for converting a program to a temporary runtime execution format.

14. The program execution processing terminal device according to claim 13, wherein
the device status is a consecutive elapsed time period of a standby state in which a user operation is not performed for the program execution processing terminal device, and
the preload control section determines a start timing based on a result of comparison between the consecutive elapsed time period of the standby state and a previously-set start time length.

15. The program execution processing terminal device according to claim 13, wherein
the device status is a current time which is managed within the program execution processing terminal device, and
the preload control section determines a start timing based on a result of comparison between the current time and a previously-set start time.

16. The program execution processing terminal device according to claim 13, wherein
the device status is a flip terminal closing/opening state of a flip-style program execution processing terminal device, and
the preload control section determines a start timing based on a change in the flip terminal closing/opening state.

17. The program execution processing terminal device according to claim 13, wherein
the device status is a terminal internal change state changing in accordance with a user's input operation performed for the program execution processing terminal device, and
the preload control section determines a start timing based on the terminal internal change state.

18. The program execution processing terminal device according to claim 13, further comprising:
a preloading process correspondence storing section for storing correspondence information indicating correspondence between a condition based on which the preloader section starts a process for converting a program to a temporary runtime execution format, and a program for which conversion is to be performed, wherein
the preload control section determines a start timing, and selects/determines a program to be converted to a temporary runtime execution format, based on the correspondence information stored in the preloading process correspondence storing section.

19. The program execution processing terminal device according to claim 18, wherein, in the correspondence information stored in the preloading process correspondence storing section, a condition based on which the preloader section starts converting a program to a temporary runtime execution format is associated with a program which is expected to be executed by a user after the condition is satisfied.

20. The program execution processing terminal device according to claim 2, wherein
the information terminal device is:
provided with an application operable without receiving a program; and
further provided with a preload instruction notifying section for receiving an instruction notification from the application, determining a start timing for performing conversion to a temporary runtime execution format based on the instruction notification received from the application, and requesting the preloader section to start a process, and
when a start is requested by the preload instruction notifying section, the preloader section performs a process for converting a program to a temporary runtime execution format.

21. The program execution processing terminal device according to claim 20, wherein
the instruction notification from the application includes a program identifier for identifying a specific program from among programs stored in the program storing section,
the preload instruction notifying section specifies the program identifier included in the received instruction notification, and requests the preloader section to start a process, and
the preloader section determines a program to be converted to a temporary runtime execution format based on the program identifier included in a start request from the preload instruction notifying section.

22. A method for performing interpretation execution for a received program; comprising:
storing the received program in a program storing section;
converting the received program stored in the program storing section to a runtime execution format for loading;
storing the runtime execution format generated in a runtime execution format storing section;
converting the runtime execution format stored in the runtime execution format storing section to a temporary runtime execution format;
converting the runtime execution format converted or the received program stored in the program storing section to a temporary runtime execution format;
storing the temporary runtime execution format generated in a temporary runtime execution format storing section;

determining, when a start-up of the received program stored in the program storing section is instructed, whether or not there is a temporary runtime execution format corresponding to the program in the temporary runtime execution format storing section;

converting, if there is a temporary runtime execution format in the temporary runtime execution format storing section as a result of the determining, the temporary runtime execution format stored in the temporary runtime execution format storing section to a runtime execution format and thus storing the runtime execution format into the runtime execution format storing section for postloading;

performing interpretation execution for the runtime execution format stored in the runtime execution format storing section, wherein the temporary runtime execution format generated includes data related to the amount of the runtime execution format based on which the temporary runtime execution format is generated and which is stored in the runtime execution format storing section, and the converting for postloading controls, based on the data related to the amount included in the temporary runtime execution format stored in the temporary runtime execution format storing section, whether or not the runtime execution format generated from the temporary runtime execution format is to be stored into the runtime execution format storing section.

23. The program execution processing method according to claim 22, wherein the runtime execution format includes a pointer indicating a storage address of predetermined data included in the runtime execution format in the runtime execution format storing section, and the temporary runtime execution format includes reference value data, which is information corresponding to the pointer indicated by indirect reference representation.

24. The program execution processing method according to claim 22, wherein the temporary runtime execution format includes data indicating a size of a runtime execution format converted from the temporary runtime execution format.

25. A program stored in a computer readable storage medium for performing interpretation execution for a received program, by which a computer is caused to execute the method of claim 22.

26. The program according to claim 25, wherein the runtime execution format includes a pointer indicating a storage address of predetermined data included in the runtime execution format in the runtime execution format storing section, and the temporary runtime execution format includes reference value data, which is information corresponding to the pointer indicated by indirect reference representation.

27. The program according to claim 25, wherein the temporary runtime execution format includes data indicating a size of a runtime execution format converted from the temporary runtime execution format.

* * * * *

UNITED STATES PATENT AND TRADEMARK OFFICE
CERTIFICATE OF CORRECTION

PATENT NO. : 7,506,323 B2 Page 1 of 1
APPLICATION NO. : 10/496968
DATED : March 17, 2009
INVENTOR(S) : Tomokazu Kanamaru It is certified that error appears in the above-identified patent and that said Letters Patent is hereby corrected as shown below:

In column 22, claim 7, line 46, please change "staff-up" to --start up--.

In column 22, claim 7, line 51, please change "staff-up" to --start up--.

In column 23, claim 11, line 10, please change "staff-up" to --start up--.

In column 23, claim 11, line 15, please change "staff-up" to --start up--.

In column 23, claim 13, line 28, please change "staff" to --start--.

Signed and Sealed this

Eleventh Day of August, 2009

David J. Kappos
*Director of the United States Patent and Trademark Office*